United States Patent
Shapiro et al.

(10) Patent No.: US 7,096,046 B2
(45) Date of Patent: Aug. 22, 2006

(54) LUMINESCENT AND ILLUMINATION SIGNALING DISPLAYS UTILIZING A MOBILE COMMUNICATION DEVICE WITH LASER

(75) Inventors: Daniel Shapiro, Redmond, WA (US); G. Eric Engstrom, Kirkland, WA (US); Peter Zatloukal, Kirkland, WA (US)

(73) Assignee: Wildseed Ltd., Seattle, WA (US)

( * ) Notice: Subject to any disclaimer, the term of this patent is extended or adjusted under 35 U.S.C. 154(b) by 279 days.

(21) Appl. No.: 10/629,010

(22) Filed: Jul. 28, 2003

(65) Prior Publication Data

US 2004/0018861 A1 Jan. 29, 2004

Related U.S. Application Data

(63) Continuation-in-part of application No. 10/334,736, filed on Dec. 31, 2002, which is a continuation-in-part of application No. 09/908,118, filed on Jul. 17, 2001.

(51) Int. Cl.
*H04B 1/38* (2006.01)
*H04M 1/00* (2006.01)

(52) U.S. Cl. .................. 455/567; 455/550; 455/553.1; 455/90.2; 340/815.4

(58) Field of Classification Search ............... 455/567, 455/550, 553.1, 90.2, 90.3; 340/815.4
See application file for complete search history.

(56) References Cited

U.S. PATENT DOCUMENTS

| | | | |
|---|---|---|---|
| 5,273,437 A | | 12/1993 | Caldwell et al. |
| 5,444,456 A | | 8/1995 | Ohta et al. |
| 5,670,971 A | * | 9/1997 | Tokimoto et al. ............. 345/31 |
| 5,726,701 A | | 3/1998 | Needham |
| 5,738,583 A | | 4/1998 | Comas et al. |
| 5,748,157 A | | 5/1998 | Eason |
| 5,800,039 A | * | 9/1998 | Lee ............................. 362/473 |
| 5,973,607 A | * | 10/1999 | Munyon ................... 340/815.4 |
| 5,993,314 A | | 11/1999 | Dannenberg et al. |
| 6,037,876 A | * | 3/2000 | Crouch ................... 340/815.53 |
| 6,265,984 B1 | | 7/2001 | Molinaroli |
| 6,404,409 B1 | | 6/2002 | Solomon |
| 6,958,777 B1 | * | 10/2005 | Pine ........................... 348/362 |
| 2003/0072169 A1 | * | 4/2003 | Naghi et al. ................. 362/555 |
| 2003/0087664 A1 | * | 5/2003 | Murray et al. .............. 455/553 |
| 2003/0100332 A1 | * | 5/2003 | Engstrom et al. ........... 455/550 |

FOREIGN PATENT DOCUMENTS

| | | |
|---|---|---|
| DE | 3347076 A1 | 7/1985 |
| EP | 0 546 844 A2 | 6/1993 |
| EP | 0 872 996 A2 | 10/1998 |

* cited by examiner

*Primary Examiner*—Matthew Anderson
*Assistant Examiner*—Tuan Pham
(74) *Attorney, Agent, or Firm*—Schwabe, Williamson & Wyatt, P.C.

(57) ABSTRACT

A wireless mobile communication device is provided with a light source arrangement configured to be able to output at least one of a steady or sweeping light pulse. The former may be used as a light pointer. The later may be used to facilitate spatial painting of illumination images. In various embodiments, the light source arrangement may include one or more collimated light sources and optionally, one or more mirrors, optically aligned and/or operated in a complementary manner. Further, the device is provided with instructions designed to selectively hold steady or operate the light source(s) and/or the mirror(s) in the complementary manner, activating/deactivating the LS to paint a line (row/column) of pixels in one direction, in accordance with the row/column of a bitmap of an illumination image to be painted, as the device is moved in another complementary direction.

23 Claims, 23 Drawing Sheets

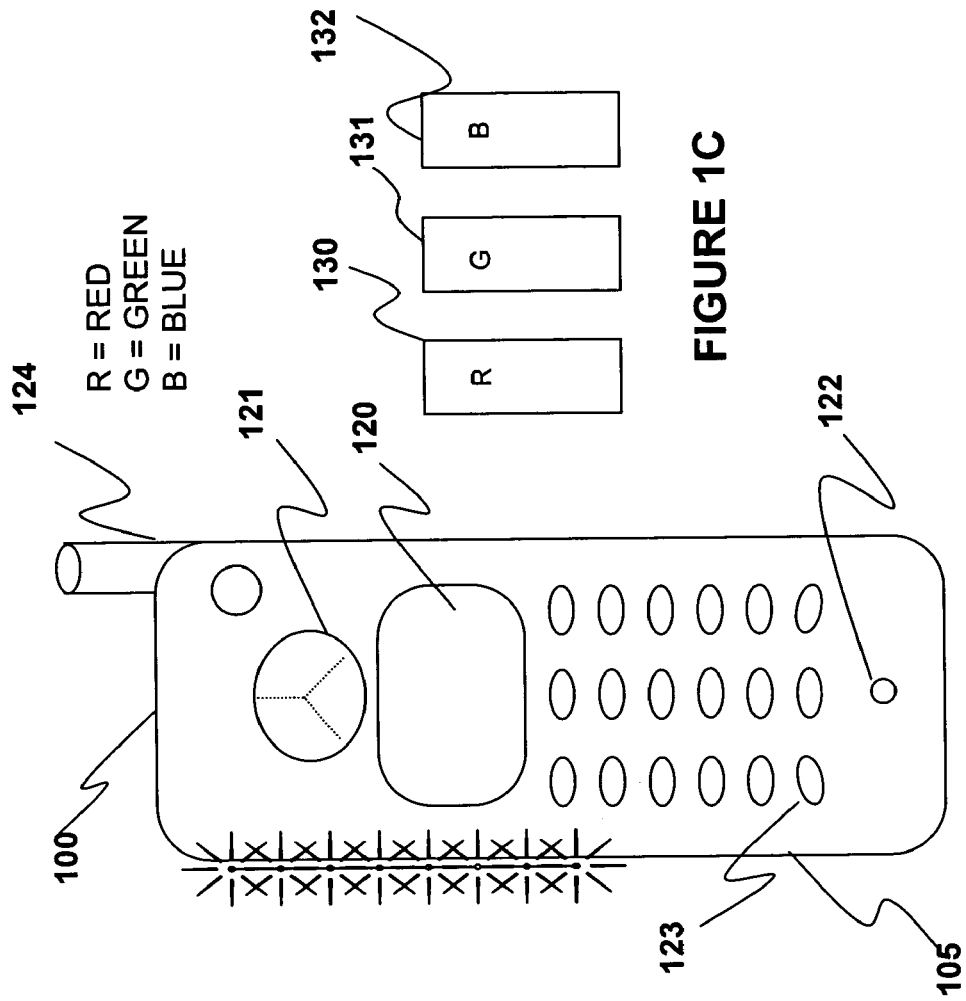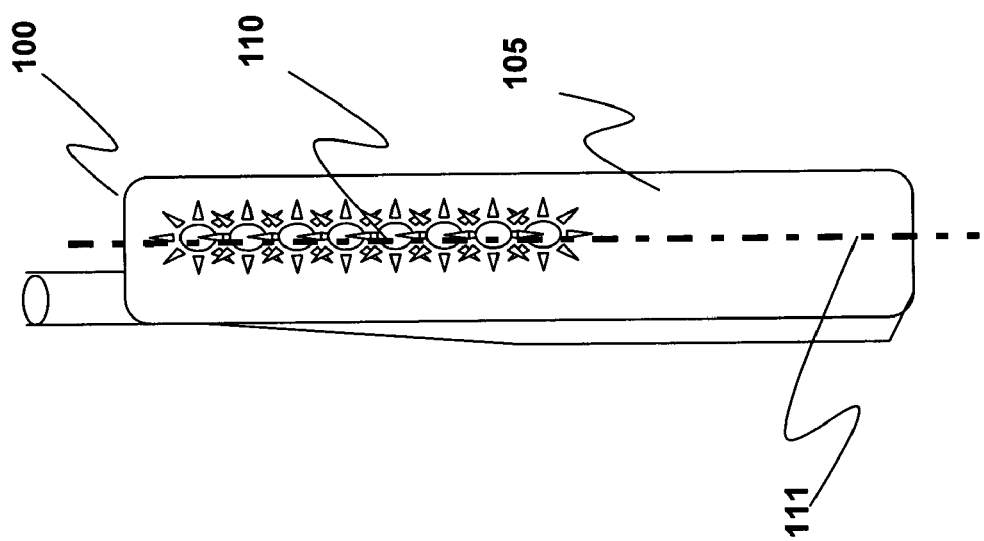

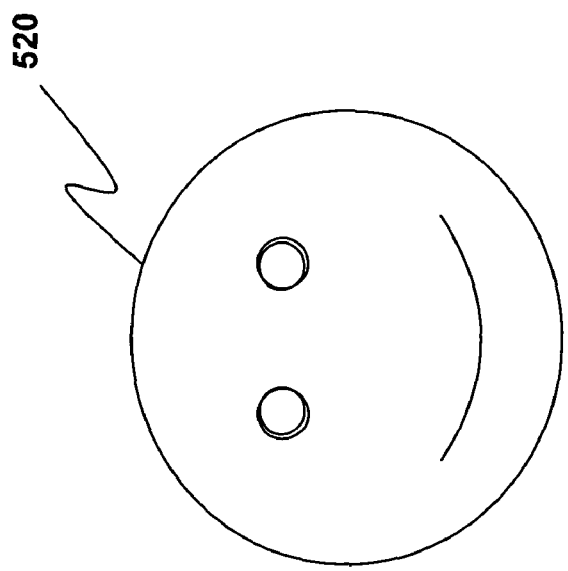
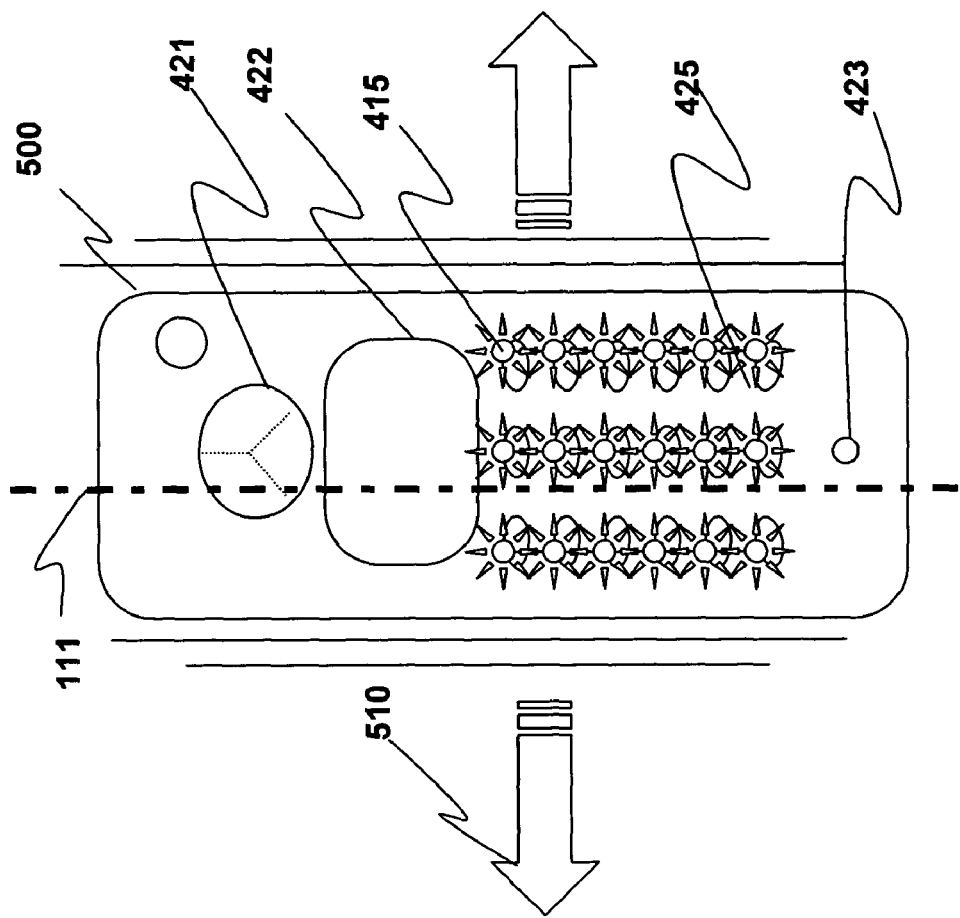

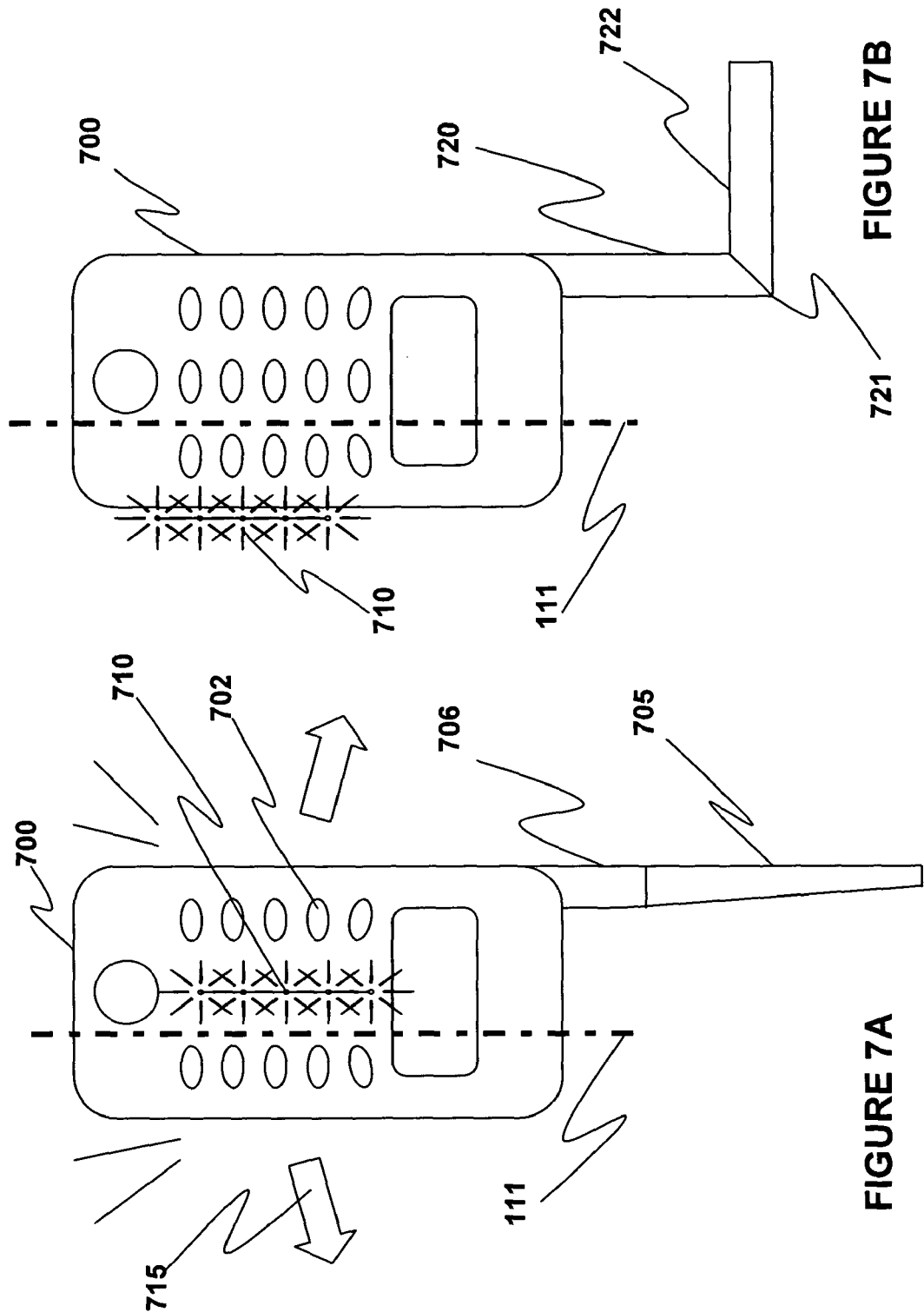

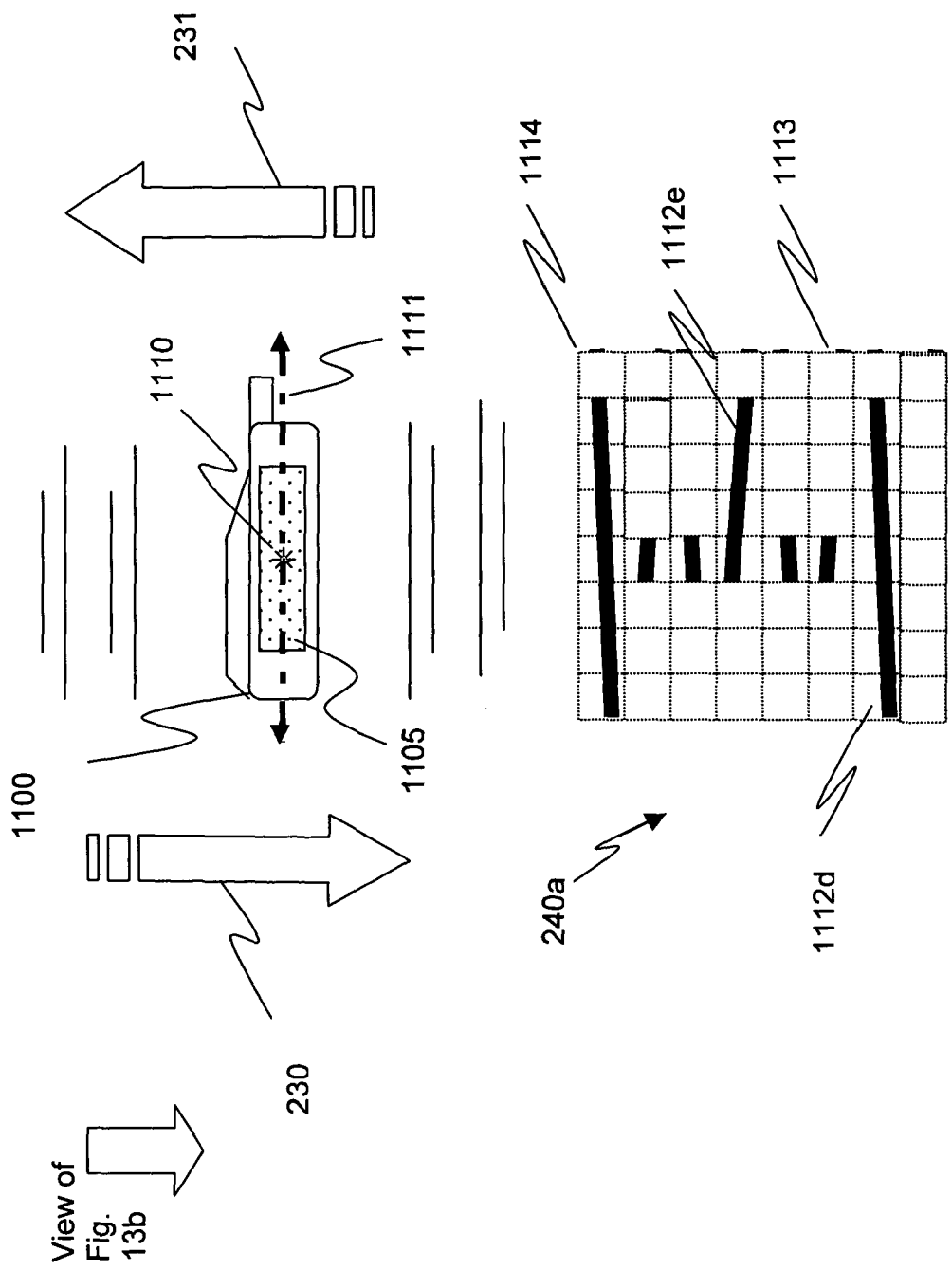

LUMINESCENT AND ILLUMINATION SIGNALING DISPLAYS UTILIZING A MOBILE COMMUNICATION DEVICE WITH LASER

RELATED APPLICATION

This application is a continuation-in-part application of application Ser. No. 10/334,736, filed on Dec. 31, 2002, entitled "Luminescent Signaling Displays Utilizing A Wireless Mobile Communication Device", which itself is a continuation-in-part application of application Ser. No. 09/908,118, filed Jul. 17, 2001, having the same title.

FIELD OF PRESENT INVENTION

The present invention relates to the field of wireless mobile communication device. More specifically, the present invention relates to facilitating luminescent and illumination signaling displays utilizing a wireless mobile communication device.

BACKGROUND OF THE PRESENT INVENTION

Advances in integrated circuit and telecommunication technology have led to wide spread adoption of wireless mobile client devices, in particular, wireless mobile communication devices. Wireless mobile communication devices, such as wireless mobile phones, offer the advantage of enabling their users to be communicatively reachable by their business associates, friends and family members, wherever the users may be, as long as they are within the reach of the service networks. Because the wireless mobile phone is prevalent, often times, users consider wireless mobile phones as their first medium of communication, even if a traditional wired line telephone is available, such as, in a users home. It is often the case, where a user will pick up their wireless mobile phone before they pick up their traditional wired line telephone. Thus, even non-professionals are increasingly dependent on their wireless mobile phones to meet their communication needs. However, there may be situations where traditional functions of a wireless mobile phone may be inadequate for a user's communication needs.

For example, if a user is within visual range of another person, with whom the user wishes to communicate, the user may talk very loudly. Talking very loudly may be ineffective if the area is noisy. Another method may be to use hand signals, which may be ineffective to convey a message due to the cryptic nature of hand signals. Making a large physical sign for display may be another method, but again, this method may be ineffective if the area is relatively dark.

The user may use a wireless mobile phone to call the other person; however, calling the other person will require the other person to have his/her own wireless mobile phone. It also requires knowledge of the other person's phone number. Additionally, the difficulties of communicating in less than ideal conditions, such as noisy conditions, will not be resolved by calling the other person using the wireless mobile phone.

The afore described difficulties with using wireless mobile phones apply equally to other wireless mobile communication devices, such as, wireless mobile pagers, instant messengers, and so forth.

Note: The term "wireless mobile phone" as used herein (in the specification and in the claims) refers to the class of telephone devices equipped to enable a user to make and receive calls wirelessly, notwithstanding the user's movement, as long as the user is within the communication reach of a "service station" of a wireless telephony service provider. Unless specifically excluded, the term "wireless mobile phone" is to include the analog subclass as well as the digital subclass (of all signaling protocols). Further, wireless mobile communication devices will simply be referred to as wireless mobile devices or wireless communication devices. Unless the specific context requires otherwise, in the general context of this application, the two terms are used interchangeably.

BRIEF DESCRIPTION OF DRAWINGS

The present invention is illustrated by way of example and not by way of limitation in the figures of the accompanying drawings, in which like references indicate similar elements and in which:

FIGS. 1A–1C illustrate one embodiment of a wireless mobile device, specifically, a wireless mobile phone, incorporated with the teachings of the present invention;

FIGS. 5A & 5B illustrate spatial painting of luminescent images facilitated by utilizing a wireless mobile phone, in particular, utilizing a wireless mobile phone body casing have an increased number of LEDs in a matrix arrangement, in accordance with an alternate embodiment of the present invention;

FIGS. 7A & 7B illustrate means for augmenting motion of a wireless mobile phone utilized to spatially paint a luminescent image, in accordance with one embodiment of the present invention;

FIGS. 13a–13c illustrate spatial painting of illumination images utilizing a wireless mobile phone, in accordance with another family of embodiments of the present invention;

DETAILED DESCRIPTION OF EMBODIMENTS OF THE PRESENT INVENTION

Figure 2A:
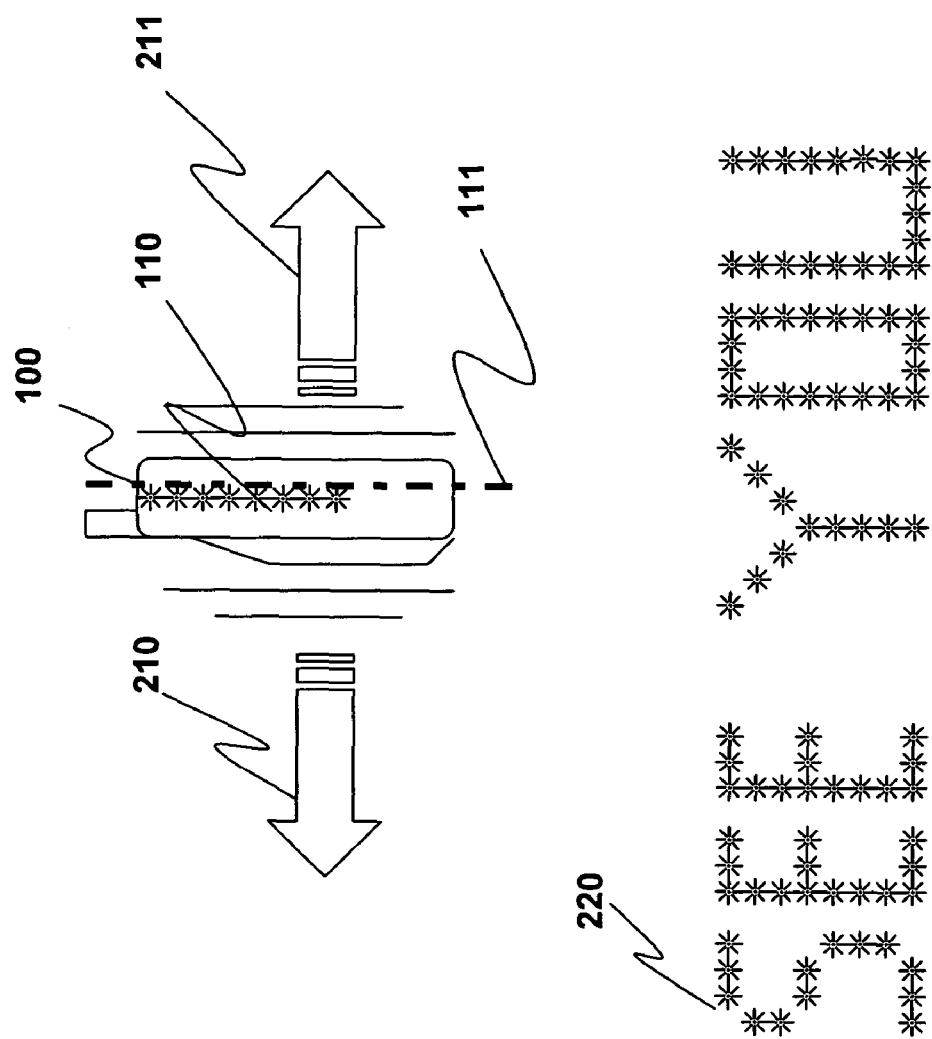
FIGS. 2a–2b illustrate exemplary luminescent images facilitated utilizing a wireless mobile phone, in accordance with one embodiment of the present invention.

For ease of understanding, the present invention will be described in the context of wireless mobile phones. However, it is anticipated that the present invention may be practiced on all wireless mobile devices, i.e. phones, pagers, instant messengers and other devices of the like. Thus, the references to wireless mobile phones in the description are merely illustrative, and are not to be read as limitations on the claims.

In the following description, various embodiments of the present invention will be described. However, it will be apparent to those skilled in the art that the present invention may be practiced with only some or all aspects of the described embodiments. For purposes of explanation, specific numbers, materials and configurations are set forth in order to provide a thorough understanding of the present invention. However, it will also be apparent to one skilled in the art that the present invention may be practiced without these specific details. In other instances, well-known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical electrical, and/or optical components of the computer system, and the term computer system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

In various embodiments of the present invention, generating and displaying luminescent images are facilitated utilizing a wireless mobile phone.

FIGS. 1A–1C illustrate one embodiment of a wireless mobile device, specifically, wireless mobile phone, incorporated with the teachings of the present invention. As illustrated in a side view of a wireless mobile phone in FIG. 1A, wireless mobile phone 100 is provided with a number of light emitting diodes (LEDs) 110 disposed on side surface 105 of the body casing of the wireless mobile phone 100 in a substantially columnar manner, along an imaginary longitudinal axis 111 of the wireless mobile phone 100. For the illustrated embodiment, eight (8) LEDs are provided and disposed in a substantially linear manner. In one embodiment, nine (9) LEDs are provided and disposed in a substantially linear manner. In alternate embodiments, more or less LEDs may be provided and/or arranged in other geometric configurations instead, as well as disposed in other or multiple exterior surfaces of the wireless mobile phone 100, including the top or bottom surface, the front or back surface, and combinations thereof. Further, while the present invention is being described in terms of LEDs, the term as used in this application (including the claims) is to be broadly construed to include all lighting sources of like kind. In other words, it is anticipated that the present invention may be practiced with other similar light sources beside LEDs.

Shown in FIG. 1B, a frontal view of the wireless mobile phone 100 includes display area 120, a speaker area 121, a microphone area 122, various keys 123 having alphanumeric functions, and an optional antenna 124. A user (not shown) may select or enter a desired image, such as, for example, the textual image "SEE YOU," by methods utilizing the various keys 123. This image may be displayed on the display area 120 for the user, providing feedback to the user on the selected or entered image. However, by virtue of the typical relatively small dimension of display area 120, this image on the display area 120 of wireless mobile phone 100 is too small to convey the image to other people visually, unless the other users have the wireless mobile phone 100 directly in front of them. In accordance with the present invention, the image may be conveyed to other people or users visually as a spatially painted luminescent image using LEDs 110 and complementary logic (e.g. block 907 of FIG. 9).

Each of the LEDs 110, shown in FIGS. 1A & 1B, may represent various types of LEDs that alone or in combination with other LEDs form a single pixel of the spatially painted luminescent image. For example, each of the LEDs 110 may be one single-color LED, or one multi-color LED (i.e., a single LED that can light in different colors). In one embodiment, each pixel is formed using three single color LEDs. The three single colors are red 130, green 131, and blue 132 (shown in FIG. 1C).

In the embodiments shown, the LEDs 110 are employed to facilitate spatial painting of luminescent images utilizing the wireless mobile phone 100. As will be described below, images may include visual images, such as, but not limited to alphanumeric characters, words, phrases, shapes, and animated images, each in a single color or in a mixture of colors.

FIG. 2a illustrates an exemplary luminescent image facilitated utilizing a wireless mobile phone, in accordance with one embodiment of the present invention. As shown in FIG. 2, the wireless mobile phone 100 having the LEDs 110 embedded in the body casing in the aforementioned manner is spatially moved horizontally in a side-to-side motion. More specifically, the spatial movement spans a plane substantially perpendicular to an intended recipient's line of vision. As the wireless mobile phone 100 is moved side-to-side in the described horizontal manner, the LEDs 110 are selectively activated, i.e., turned on and off, in various patterns in a manner timed to coordinate with the spatial movement to effectuate formation of a luminescent image 220, visible to the recipient.

The side-to-side motion may be achieved by a number of alternate mechanisms. In one technique, the user holds the wireless mobile phone 100 in one hand, with the LEDs 110 directed towards the intended recipient of the luminescent image 220 and the longitudinal axis 111 of the wireless mobile phone 100 oriented approximately vertical, and moves the wireless mobile phone 100 side-to-side horizontally. The side-to-side motion includes moving the mobile phone 100 in a first direction 210 horizontally, then reversing the direction, and moving the mobile phone in an opposite direction 211, also horizontally. The reversal of directions can be repeated a number of times. An image or a string of text may be repeatedly painted upon each movement in a single direction. Alternatively, the image or string of text may change upon reversal of directions, in order to spell out a longer string of text or a sequence of images. The luminescent image 220 is perceptually sustained, as the wireless mobile phone 100 is moved in the side-to-side motion horizontally, and the LEDs are repeatedly activated/deactivated in a spatial movement dependent manner.

The luminescent image 220 (shown in FIG. 2) is painted utilizing the wireless mobile phone 100 by selectively activating LEDs 110 (turning on and off) at a rate appropriate for a phenomenon known as persistence of vision. Persistence of vision is a phenomenon that allows a human eye to see a trail of light when a person moves a light source around in the dark.

Thus, as the wireless mobile phone 100 is moved in the side-to-side motion at a faster rate, in most circumstances, the luminescent image 220 generally becomes clearer and sharper. However, if the wireless mobile phone 100, having the LEDs 110, is moved slower in the side-to-side motion horizontally, in most circumstances, the luminescent image 220 generally becomes less clear. The viewer, instead of seeing a steady image, may see a flickering or blurred luminescent image. The persistence of vision phenomenon is known, and accordingly, will not be discussed in further detail.

In one embodiment, an accelerometer (shown as ref. 950 in FIG. 9) may be utilized to determine the motion of the wireless mobile phone 100. The accelerometer is employed to aid in coordinating the selective activation of LEDs 110, to spatially paint a relatively clear luminescent image 220 at relatively slower side-to-side motions. The accelerometer measures the rate at which the speed of an object is changing, i.e., its acceleration, by measuring the forces exerted on its components, and these measurements are commonly transferred into electrical signals. The signals of the accelerometer can be used to determine when the wireless mobile phone reverses directions. Additionally, the accelerometer may aid in indicating movements in different directions.

For example, referring to FIG. 2a, the accelerometer may aid in indicating changes in direction of motion between the first direction 210, and the second direction 211 (i.e., left to right and right to left). Indicating changes in direction facilitates spatial painting of luminescent images corresponding to the direction of motion. For example, in FIG. 2, the luminescent image 220 may be spatially painted to be viewed in one direction, i.e., the LEDs are activated based on direction of motion to prevent differing images corresponding to the two directions 210 and 211, one image in the first direction 210 and a reverse image in the second direction 211. The image is painted in the first direction 210, and then, painted in reverse in direction 211 presenting a backward image. These accelerometers are available in very small sizes, such as, but not limited to, a piezoelectric micro-miniature accelerometers, allowing it to be included in a variety of devices, such as, wireless mobile phone 100.

Figure 2B:
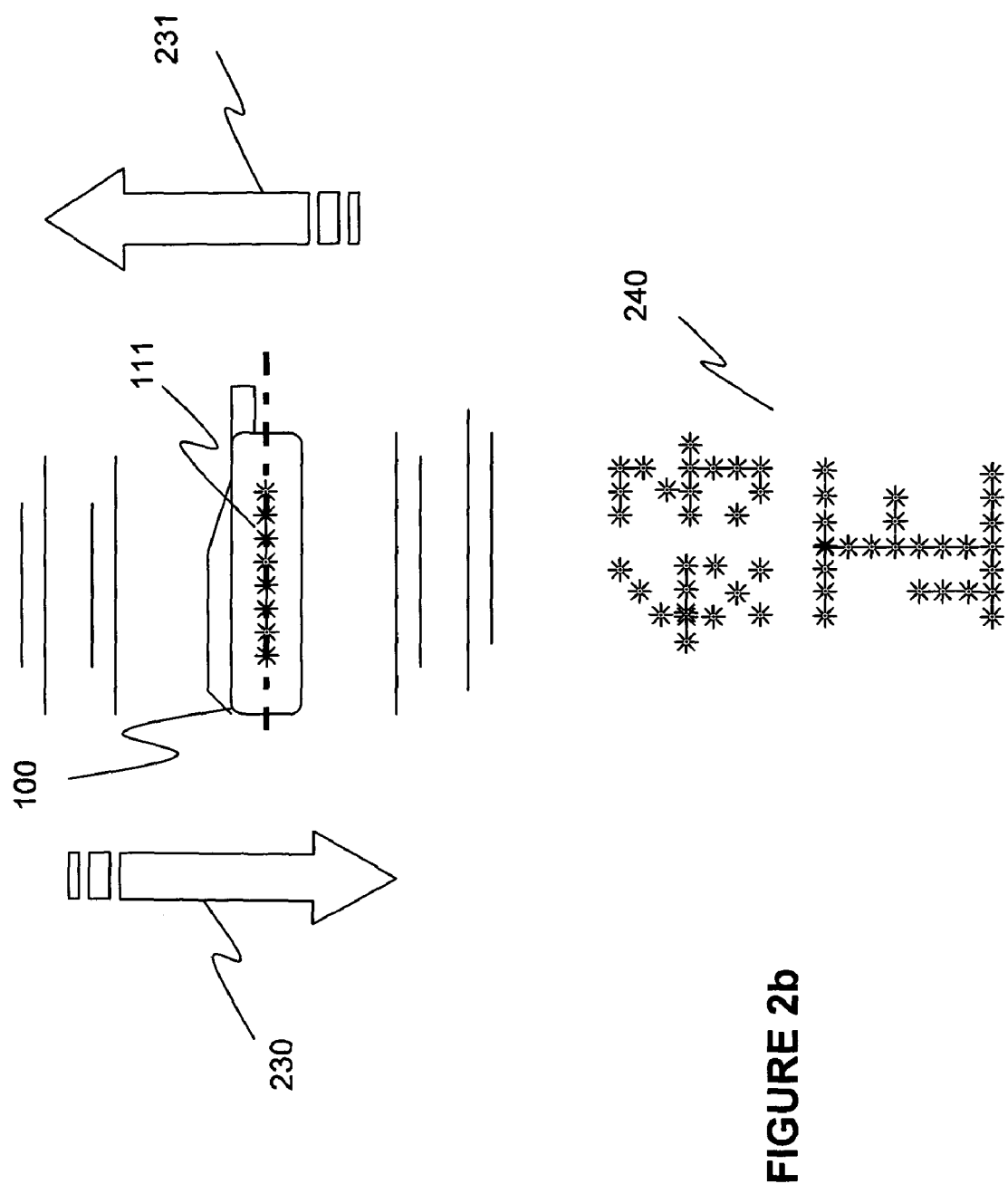

FIG. 2b illustrates an exemplary luminescent image facilitated utilizing a wireless mobile phone, in accordance with one embodiment of the present invention. As shown in FIG. 2b, the wireless mobile phone 100 having the LEDs 110 embedded in the body casing in the aforementioned manner is spatially moved in a top-to-bottom or bottom-to-top motion, vertically. More specifically, the spatial movement spans a plane substantially perpendicular to an intended recipient's line of vision. As the wireless mobile phone 100 is moved top-to-bottom or bottom-to-top in the described manner, the LEDs 110 are selectively activated, i.e., turned on and off, in various patterns in a manner timed to coordinate with the spatial movement to effectuate formation of a luminescent image 240, visible to the recipient.

The top-to-bottom or bottom-to-top motion may be achieved by a number of alternate mechanisms. In one technique, the user holds the wireless mobile phone 100 in one hand, with the LEDs 110 directed towards the intended recipient of the luminescent image 240 and the longitudinal axis 111 of the wireless mobile phone 100 oriented approximately horizontal, and moves the wireless mobile phone 100 top-to-bottom or bottom-to-top. The top-to-bottom or bottom-to-top motion includes moving the mobile phone 100 in a first direction 230, then reversing the direction, and moving the mobile phone in an opposite direction 231. The reversal of directions can be repeated a number of times. An image or a string of text may be repeatedly painted upon each movement in a single direction. Alternatively, the image or string of text may change upon reversal of directions, in order to paint a longer series of characters or a sequence of images. The luminescent image 240 is perceptually sustained, as the wireless mobile phone 100 is moved in the top-to-bottom and/or bottom-to-top motion, and the LEDs are repeatedly activated/deactivated in a spatial movement dependent manner.

The luminescent image 240 (shown in FIG. 2b) is painted utilizing the wireless mobile phone 100 by selectively activating LEDs 110 (turning on and off) at a rate appropriate for a phenomenon known as persistence of vision. Persistence of vision is a phenomenon that allows a human eye to see a trail of light when a person moves a light source around in the dark.

Thus, as the wireless mobile phone 100 is moved in the top-to-bottom or bottom-to-top motion at a faster rate, in most circumstances, the luminescent image 240 generally becomes clearer and sharper. However, if the wireless mobile phone 100, having the LEDs 110, is moved slower in the top-to-bottom or bottom-to-top motion, in most circumstances, the luminescent image 240 generally becomes less clear. The viewer, instead of seeing a steady image, may see a flickering or blurred luminescent image. The persistence of vision phenomenon is known, and accordingly, will not be discussed in further detail.

In one embodiment, as the earlier described embodiment, an accelerometer (shown as ref. 950 in FIG. 9) may also be utilized to determine the motion of the wireless mobile phone 100. The accelerometer is employed to aid in coordinating the selective activation of LEDs 110, to spatially paint a relatively clear luminescent image 240 at relatively slower top-to-bottom or bottom-to-top motions. The accelerometer measures the rate at which the speed of an object is changing, i.e., its acceleration, by measuring the forces exerted on its components, and these measurements are commonly transferred into electrical signals. The signals of the accelerometer can be used to determine when the wireless mobile phone reverses directions. Additionally, the accelerometer may aid in indicating movements in different directions.

For example, referring to FIG. 2b, the accelerometer may aid in indicating changes in direction of motion between the first direction 230, and the second direction 231 (i.e., top-to-bottom and bottom-to-top). Indicating changes in direction facilitates spatial painting of luminescent images corresponding to the direction of motion. For example, in FIG. 2b, the luminescent image 240 may be spatially painted to be viewed in one direction, i.e., the LEDs are activated based on direction of motion to prevent differing images corresponding to the two directions 230 and 231, one image in the first direction 230 and a reverse image in the second direction 231. The image is painted in the first direction 230, and then, painted in reverse in direction 231 presenting a backward image. These accelerometers are available in very small sizes, such as, but not limited to, a piezoelectric micro-miniature accelerometers, allowing it to be included in a variety of devices, such as, wireless mobile phone 100.

Figure 3:
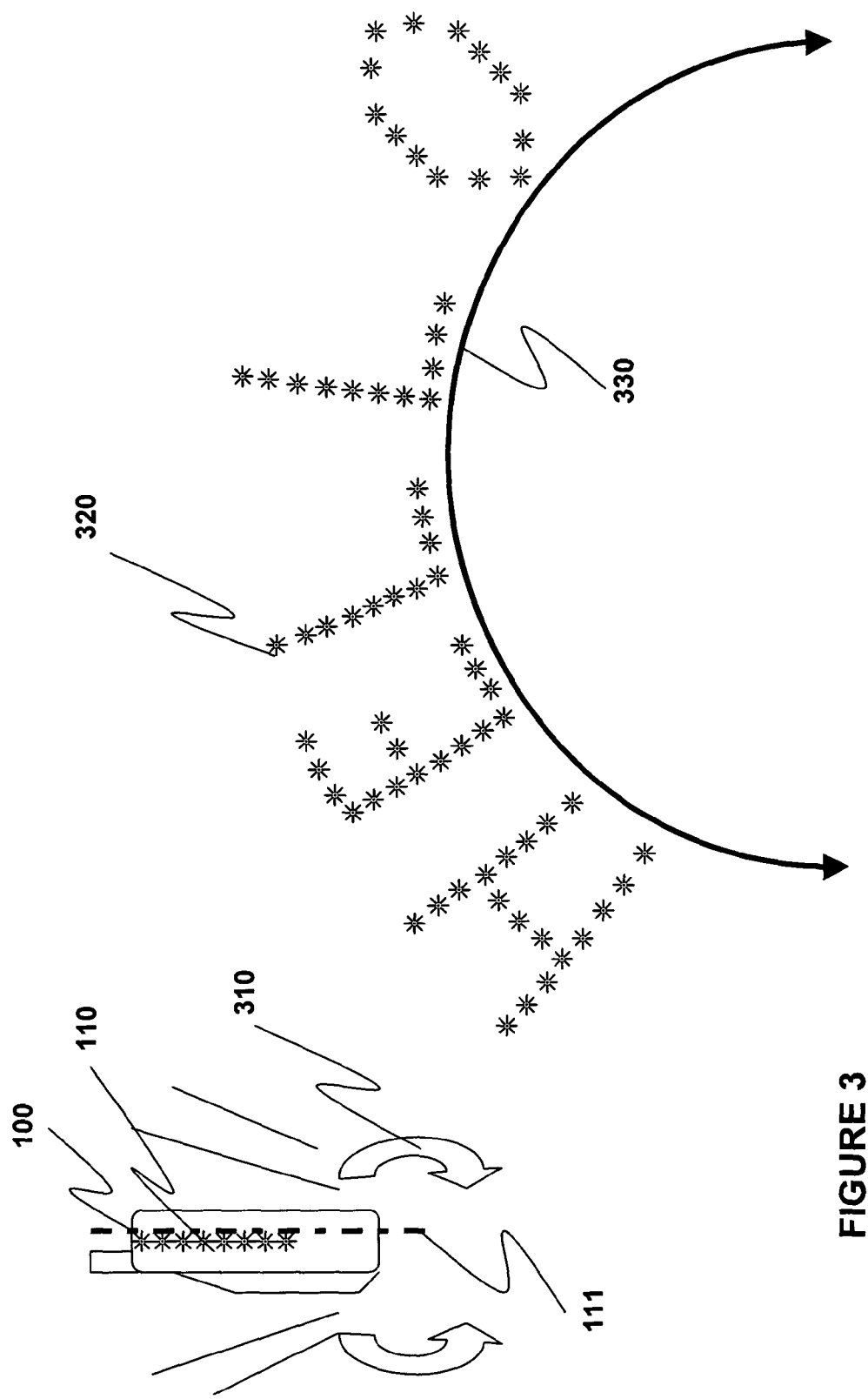
FIG. 3 illustrates effects of different types of motion on the spatial painting of luminescent images using LEDs of a wireless mobile phone, in accordance with one embodiment of the present invention.

FIG. 3 illustrates effects of different types of motion on the spatial painting of luminescent images using LEDs of a wireless mobile phone, in accordance with one embodiment of the present invention. As shown in FIG. 3, the wireless mobile phone 100, having the LEDs 110 embedded in the body casing, is moved in an arcing motion 310. The arcing motion of the wireless mobile phone 100 causes a "bent" luminescent image 320 to be spatially painted. The bent luminescent image 320 follows an arc path 330, i.e., the path of the motion of the wireless mobile phone 100. However, it should be appreciated that the luminescent images may be likewise spatially painted in shapes corresponding to various other paths of motion, beside the side-to-side, top-to-bottom/bottom-to-top, and arc motions described thus far. Moreover, the luminescent textual image may be painted in English or any one of a number of non-English language (such as Chinese), including languages with rendering orientations other than the left-to-right and top-to-bottom orientation of English.

In FIGS. 1–3, the body casing of the wireless mobile phone 100 has the LEDs 110 embedded in a substantially linear manner, along a longitudinal axis 111 of the wireless mobile phone 100. As alluded to earlier, the body casing of the wireless mobile phone 100 may have the LEDs 110 embedded in a variety of orientations with a preferred orientation having at least 8 LEDs arranged so that when the wireless mobile phone 100 is moved, the 8 LEDs form 8 parallel lines spread evenly apart. Alternatively, the wireless mobile phone 100 may have the LEDs 110 embedded in an orientation having at least 16 LEDs arranged to form 8 parallel lines (2 LEDs per line). Additionally, shown in FIGS. 1–3, the body casing of the wireless mobile phone 100 has eight LEDs 110. Eight or nine LEDs is the preferred number, but the number of LEDs may be more or less than eight or nine. Additionally, as described above with respect to FIG. 1, the LEDs shown in FIGS. 1–3 may be a variety of types of LEDs.

As a result, spatial painting of luminescent images may be effectuated utilizing a wireless mobile phone.

Figure 4B:
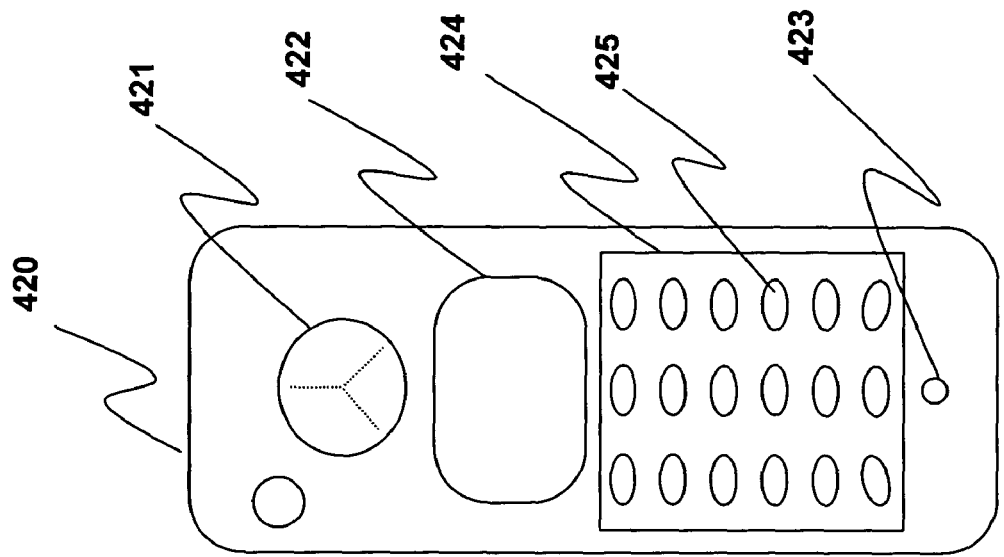
FIGS. 4A & 4B illustrate an alternate embodiment of the present invention for spatially painting luminescent images facilitated by utilizing a wireless mobile phone.
Figure 4A:
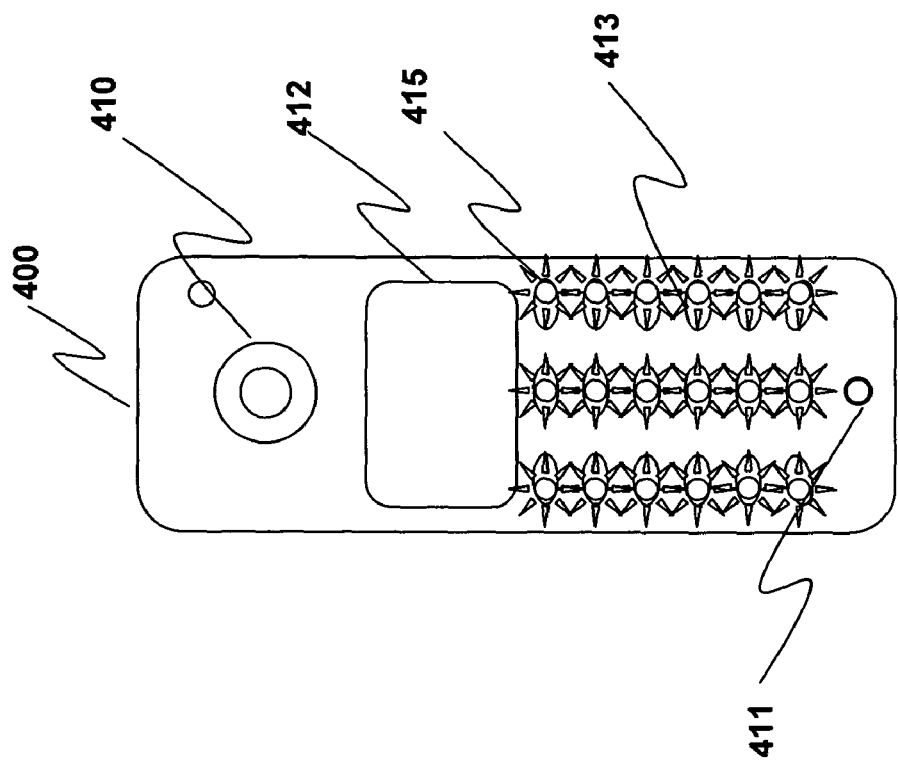

FIGS. 4A & 4B illustrate an alternate embodiment of the present invention for spatially painting luminescent images facilitated by utilizing a wireless mobile phone. FIGS. 4A & 4B show a wireless mobile phone having a body casing comprising two portions. One portion is an exposed wireless mobile phone 400 and the other portion is a covering 420. One embodiment of the covering 420 is described below with respect to FIG. 8B. The exposed wireless mobile phone 400 and the covering 420 are oriented such that the left side of the exposed wireless mobile phone 400 (shown in FIG. 4A) corresponds to the right side of the covering 420 (shown in FIG. 4B), i.e., FIG. 4B is a view of the inside of the covering 420.

Referring to FIG. 4A, the exposed wireless mobile phone 400 includes a speaker 410, a microphone 411, a display 412, and a number of buttons 413. In substantially the same locations as the buttons 413, are a number of LEDs 415 in a matrix arrangement (or multi-row, multi-column linear formations). The LEDs 415 are in the matrix arrangement to closely match the arrangement of the buttons 413 in order for the light of the LEDs to be visible through keys 425 (shown in FIG. 4B) which cover the buttons 413. As previously described, the LEDs 415 (or other light sources) may be of single colors or multi-colors, of the same or different colors. The colors may include red 130, green 131, and blue 132 or other combinations (shown in FIG. 1C). The light sources may be arranged in any geometric configurations, and disposed on one or more exterior surfaces.

Referring now to FIG. 4B, the covering 420 includes a speaker area 421, a display area 422, a microphone area 423, and a keypad 424 on which keys 425 are molded to facilitate the pressing of the buttons 413 on the exposed wireless mobile phone 400 (shown in FIG. 4A). The keypad 424, in particular, the keys 425, may be made of a translucent material to facilitate the viewing of the LEDs 415 disposed beneath, when the covering 420 is in place. In the illustrated embodiment of FIGS. 4A & 4B, a wireless mobile phone has a number of LEDs 415 in a matrix arrangement, placed close to the buttons 413, underneath the keys 425 of the key pad 424, allowing for an external appearance of a conventional wireless mobile phone. However, the LEDs may be arranged in a matrix arrangement on any of the exposed surfaces, such as, but not limited to, the back of a wireless mobile phone. In the illustrated embodiment, once the exposed wireless mobile phone 400 and the covering 420 are attached to each other, light emitted from the LEDs 415 are visible through the keys 425. In a preferred arrangement, three LEDs are underneath each of the keys 425, one red 130, one green 131, and one blue 132 (shown in FIG. 1C).

FIGS. 5A & 5B illustrate spatial painting of luminescent images by utilizing a wireless mobile phone such as the one described above in FIGS. 4A & 4B. Shown in FIG. 5A, wireless mobile phone 500 is moved in a side-to-side motion 510, as previously described with respect to FIG. 2. In the one embodiment, the luminescent image painted is a shape, in particular, a simple rendering of a face 520 (shown in FIG. 5B). Additionally, the face 520 may be animated, such as, but not limited to, the face 520 changing shape to visually alter the face 520 in the form of a wink, a smile, and so forth, as wireless mobile phone 500 moves back and forth, and the LEDs are being activated/deactivated.

In one embodiment, the assembled wireless mobile phone 500 (shown in FIG. 5A) may be static, i.e., not moved at all, and the luminescent image, the face 520 (shown in FIG. 5B), may be painted scrolling across the LEDs 415 in the matrix arrangement. Additionally, the luminescent image may also change to be animated as it scrolls across the LEDs 415. For example, the luminescent image may change shape to smile or wink, and so forth.

As described earlier, the number of LEDs may vary. A greater number of LEDs can provide higher resolution images and greater visibility. For example, in addition to the LEDs beneath the keys, LEDs may be also be embedded on or affixed to the covering to provide a larger matrix upon which the luminescent images may be generated and displayed. In one embodiment, the wireless mobile phone includes two parallel rows of LEDs. Each LED in one row has a corresponding LED in the second row, forming a pair of corresponding LEDs. Each corresponding pair of LEDs is turned on and off simultaneously, thereby expanding the amount of light that is produced. In general, the activation and deactivation may be further controlled in a manner that is formation dependent, i.e. depending on how the LEDs are grouped and organized in their placements.

Images, such as the examples shown in FIG. 5B, may be pre-installed in a nonvolatile memory (shown as ref. 910 in FIG. 9), or alternatively, may be retrieved from an Internet address, where the address specifications may be in the form of one or more Uniform Resource Identifiers (URI). An image can also be transferred to the mobile phone using instant messaging communications, by a telephone call, or using a graphical manipulation tool on the wireless mobile phone. Text to be displayed can be entered by using any of the text input mechanisms on the mobile phone, such as the keys 425.

In one embodiment, the body casing of the wireless mobile phone may have LEDs embedded in more than one side. For example, a body casing of a wireless mobile phone may have both LEDs embedded in a substantially columnar manner, along a longitudinal axis (shown in FIGS. 1–3) and LEDs disposed below keys (shown in FIG. 4A). In this example, when the wireless mobile phone is moved in two directions 210 & 211 (shown in FIG. 2), the LEDs embedded in the columnar manner, along the longitudinal axis, are activated and deactivated to spatially paint a first luminescent image similar to the luminescent image 220 (shown in FIG. 2). In addition, a second luminescent image is spatially painted by the LEDs disposed below the keys. The second luminescent image having a three-dimensional quality to it, because the second luminescent image moves towards and away from the viewer.

In addition to the motions described, i.e. side-by-side, arc like, and so forth, the present invention may be practiced with other patterns of motions, including in particular, but are not limited to, a circular pattern of motion.

In one embodiment, in addition to employing one group of LEDs to spatially paint images for other viewers, another group of LEDs may be employed to spatially paint the same images, or provide certain visual indicators for the user of the wireless mobile phone. The LEDs visible to the user may aid the user in timing the motion of the wireless mobile phone to spatially paint a clearer luminescent image. As alluded to earlier, the user may be aided by the LEDs, placed for the viewing of the user, spatially painting an identical luminescent image as the one being projected to others. The user moves the wireless mobile phone at a rate to spatially paint a clear luminescent image for himself/herself.

Alternatively, a single timing LED may be employed instead. The timing LED is located in a position such that it is visible by the user while the user is moving the phone as described above. As the wireless mobile phone is in motion, the user tries to maintain a luminescent image of a solid line painted by the timing LED. The optimal speed of movement is the minimum necessary to maintain a view of a solid line. Faster movement causes the image to become compressed. Slower movement causes the image to become unclear or broken. The timing LED maintains an "on" state during the procedure of painting an image. Alternatively, the timing LED may alternate on and off at a rate such that the optimal speed of movement causes a dotted line to be displayed. In yet other embodiments, an audible tone may be employed to guide the user in moving the phone at a speed that yields better visual results. For example, a "beeping" tone may be provided to serve as a guide to the user. In yet other embodiments, tactile feedback, such as vibration, may be provided to guide the user.

As a result, spatial painting of luminescent images, including animated images, is facilitated utilizing a wireless mobile phone.

Figure 6:
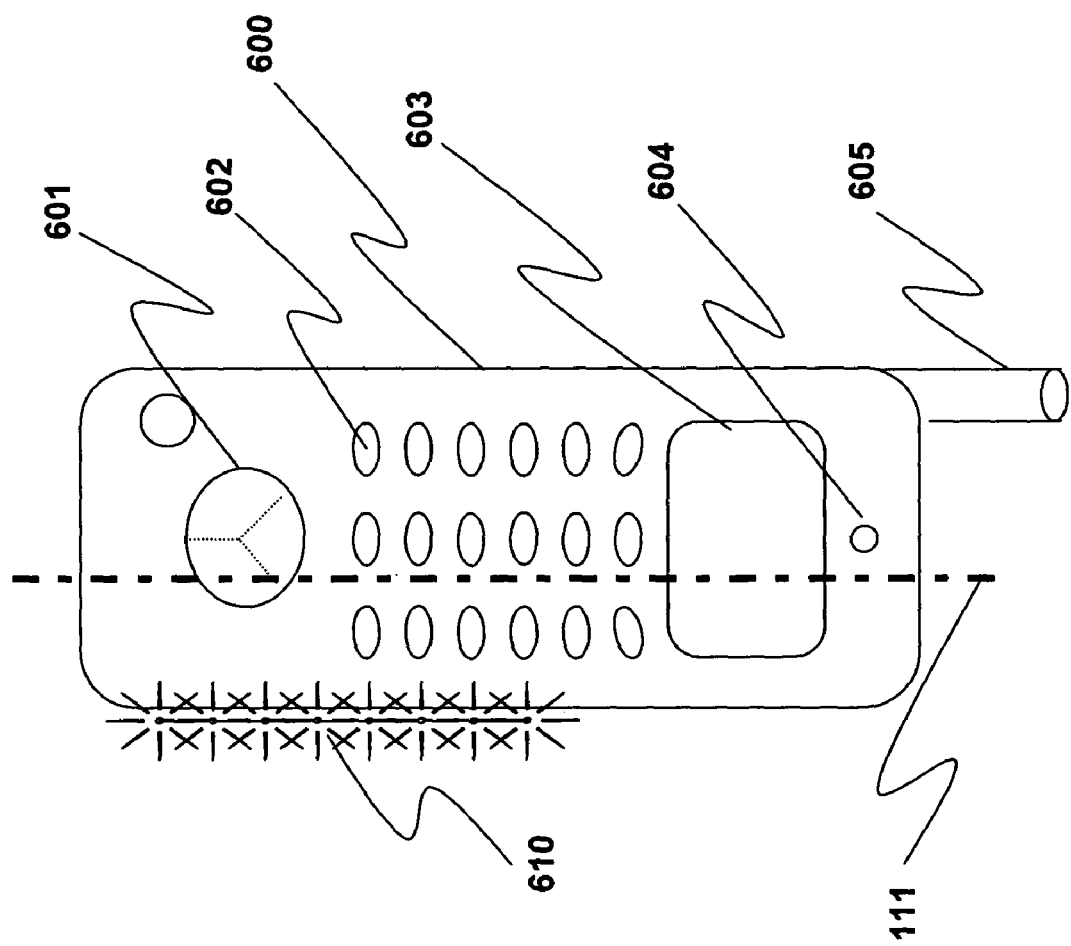
FIG. 6 illustrates facilitation of spatial painting of luminescent images utilizing a wireless mobile phone in an alternate configuration.

FIG. 6 illustrates an alternate configuration of a wireless mobile phone for facilitation of spatial painting of luminescent images utilizing a wireless mobile phone in an alternate configuration. As shown in FIG. 6, a wireless mobile phone 600 with inverted placement of antenna and keypad includes a speaker area 601, a number of keys 602 directly below the speaker area 601, a display area 603 disposed below the keys 602, and a microphone area 604. An example of a wireless mobile phone with inverted placement of antenna and keypad is disclosed in related U.S. patent application titled "A WIRELESS MOBILE PHONE WITH INVERTED PLACEMENT OF ANTENNA AND INPUT KEYPAD", Ser. No. 09/767,526 filed Jan. 22, 2001, the subject matter of which is incorporated herein by reference. Additionally, the body casing has LEDs 610 disposed on one of its side exterior surface, parallel to the longitudinal axis 111 and opposite an antenna 605, in accordance with the teachings of the present invention. As previously described, the body casing of the wireless mobile phone 600 may have LEDs 610 disposed in a variety of alternative manners, such as, but not limited to, a matrix arrangement disposed beneath keys 615. Additionally, as previously described, the wireless mobile phone 600 may spatially paint luminescent messages either when in motion or when static, based at least upon the number and arrangement of the LEDs 610. The wireless mobile phone 600 with inverted placement of antenna and keypad facilitates augmenting the motion of the wireless mobile phone as will be described in the text accompanying FIGS. 7A & 7B.

FIGS. 7A & 7B illustrate means for augmenting motion of a wireless mobile phone utilized to spatially paint a luminescent image, in accordance with one embodiment of the present invention. As shown in FIG. 7A, a wireless mobile phone 700 is in an inverted configuration with LEDs 710 disposed beneath the keys 702. In FIG. 7A, a cantilever attachment 705 is attached to an antenna 706 extending in a vertical direction, parallel to the longitudinal axis 111, below the bottom surface of the wireless mobile phone 700. This addition of the lever arm to the wireless mobile phone 700 facilitates an increase in the rate of the side-to-side motion when wireless mobile phone is held by the cantilever attachment 705, i.e., an increase in the angular acceleration of the inverted configuration wireless mobile phone 700. In the embodiment shown in FIG. 7A, the cantilever attachment 705 is used to move the inverted wireless mobile phone 700 in a side-to-side motion 715. This augmenting of velocity of the side-to-side motion 715 improves the resolution of the luminescent images. In various embodiments, the cantilever attachment 705 is made of an elastomeric material, such as, but not limited to, rubber, to enhance the forced vibration resulting from the added cantilever attachment of the inverted wireless mobile phone.

Shown in FIG. 7A, the cantilever attachment 705 is a separate part attached to the antenna 706. However, the cantilever attachment 705 may be any type of extension for increasing the rate of motion of the wireless mobile phone 700 such as, but not limited to, a relatively extended one-piece antenna attached to the body casing. Additionally, this type of augmenting of the motion of a wireless mobile phone may be applied to any type of wireless mobile phone utilized to facilitate generation and display of luminescent images. When the present invention is practiced on a wireless mobile phone having an antenna located on the top of the phone, the graphic or text image displayed can be inverted in order to be viewed appropriately when the user holds the phone in an inverted position, with the antenna pointed downward.

Referring now to FIG. 7B, one embodiment of a wireless mobile phone 700 with inverted placement of antenna and keypad is illustrated, having the LEDs 710 disposed parallel to the longitudinal axis 111 on the side opposite a bending antenna 720. In FIG. 7B, the bending antenna 720 is shown bent 90 degrees to the vertical at a bend point 721. The bending antenna 720 is held by a user at a handle 722 with the handle 722 locked in the bent position. The locking of the bent position may be achieved by any known mechanical locking method. The user proceeds to rotate the wireless mobile phone 700 about the handle 722 facilitating a higher rate of rotation of the wireless mobile phone 700. This higher rate of rotation improves the resolution of the luminescent images. Here again, the placement of the LEDs 710 may be in any location in/on the wireless mobile phone 700, and the bending antenna 722 may be configured to bend in alternate directions in order face the LEDs 710 towards the most effective direction. While FIG. 7B illustrates how a wireless mobile phone with inverted placement of antenna and keypad may be augmented to allow a user to control spatial movement, traditionally oriented wireless mobile phone may also be augmented in a similar manner.

As a result, motion of a wireless mobile phone utilized to facilitate spatial painting of luminescent images may be augmented, in accordance with one embodiment of the present invention.

Figure 8B:
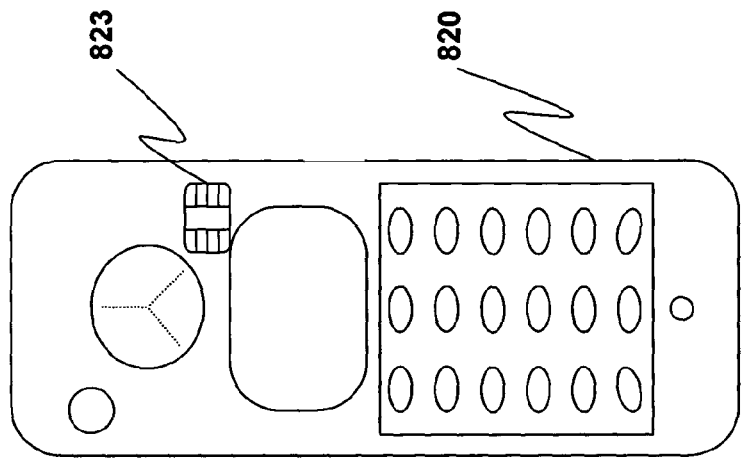
FIGS. 8A–8C illustrate spatial painting of luminescent images utilizing a wireless mobile phone having a body casing comprising two portions, one of which is interchangeable, in accordance with the teachings of the present invention.
Figure 8C:
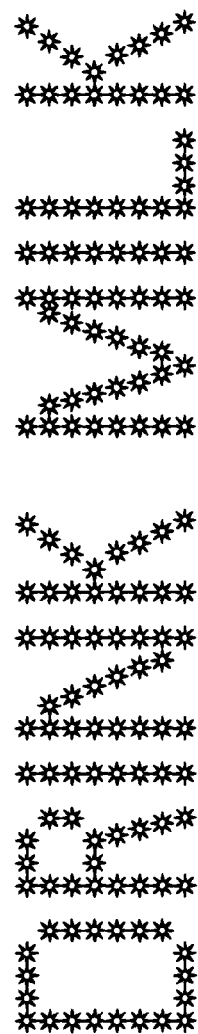
Figure 8A:
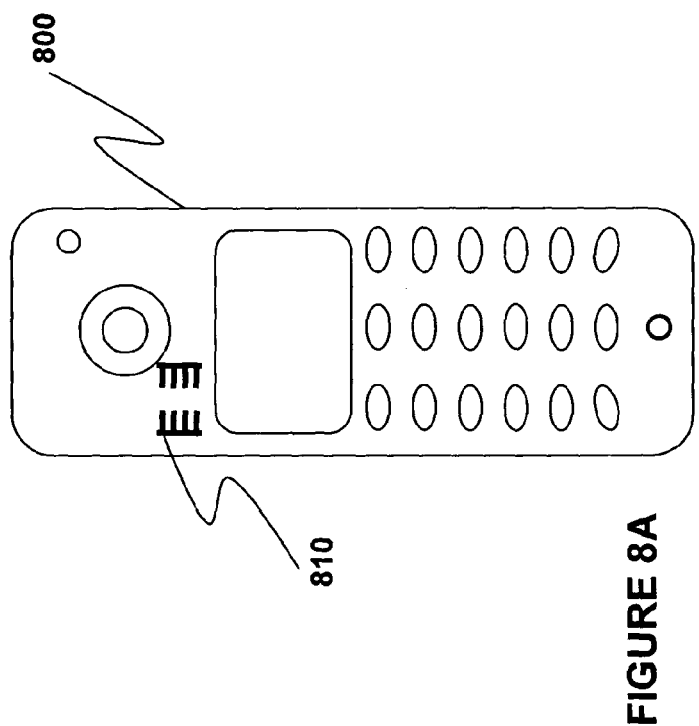

FIGS. 8A–8C illustrate spatial painting of luminescent images utilizing a wireless mobile phone having a body casing comprising two portions, one of which is interchangeable, in accordance with the teachings of the present invention. FIGS. 8A & 8B show a wireless mobile phone having a body casing comprising an exposed wireless mobile phone 800 and an interchangeable covering 820. The exposed wireless mobile phone 800 and the interchangeable covering 820 are oriented such that the left side of the exposed wireless mobile phone 800 (shown in FIG. 8A) corresponds to the right side of the interchangeable covering 820 (shown in FIG. 8B), i.e., FIG. 8B is a view of the inside of the interchangeable covering 820.

In accordance with one embodiment of the present invention, interchangeable covering 820 includes an embedded electronic component 823 having data/programming for generating and displaying luminescent images corresponding to a theme of the interchangeable covering 820.

In alternate embodiments, interchangeable cover 820 may be an accessory cover that does not form a part of wireless mobile phone 800. Such a cover is adorned by wireless mobile phone 800 as an accessory, like jewelry and scarf are adorned to complement clothing.

An example of an interchangeable covering is disclosed in related U.S. patent application titled "METHOD AND APPARATUS FOR PERSONALIZING MOBILE ELECTRONIC DEVICES INCLUDING INTERCHANGEABLE COVERINGS WITH EMBEDDED PERSONALITY", Ser. No. 10/087,098, filed Mar. 1, 2002, the subject matter of which is incorporated herein by reference.

Another example of an interchangeable covering is disclosed in related U.S. patent application titled "Personalization of Mobile Electronic Devices using Smart Accessory Covers", Ser. No. 10/428,815, filed May 2, 2003, the subject matter of which is also incorporated herein by reference.

The data and/or programming logic to control the activation and deactivation of LEDs to facilitate spatial painting of luminescent messages may be stored in an electronic component of the wireless mobile phone such as a non-volatile memory (shown as ref. 910 in FIG. 9), or alternatively, in the electronic component 823 of the interchangeable covering 820. The electronic component may be a microprocessor, a memory, a combination of both, or other electronic components of the like.

In the embodiment shown in FIGS. 8A–8C, electronic component 823 of the interchangeable covering 820 may include a theme, such as, but not limited to, dairy products. The data and/or programming logic stored in the electronic component 823 of the interchangeable covering 820 may include images related to dairy products. Once a user attaches the interchangeable covering 820 to the wireless mobile phone having a coupler 810 to form an interface with the electronic component 823, a luminescent image that is automatically generated and displayed may be a dairy related image, shown for example in FIG. 8C. Additionally, the luminescent image generated and displayed may be a luminescent image of a cow, and so forth.

In FIGS. 8A–8C, as previously described, LEDs may be disposed in a variety of ways contemplated within the spirit and scope of the invention on the exposed wireless mobile phone 800 and/or interchangeable covering 820. In various embodiments, interchangeable covering 820 may be an interchangeable faceplate, while in other embodiments, covering 820 may be an interchangeable "skin".

As a result, spatial painting of luminescent images utilizing a wireless mobile phone is facilitated incorporating interchangeable coverings is described., in accordance with the teachings of the present invention.

Figure 9:
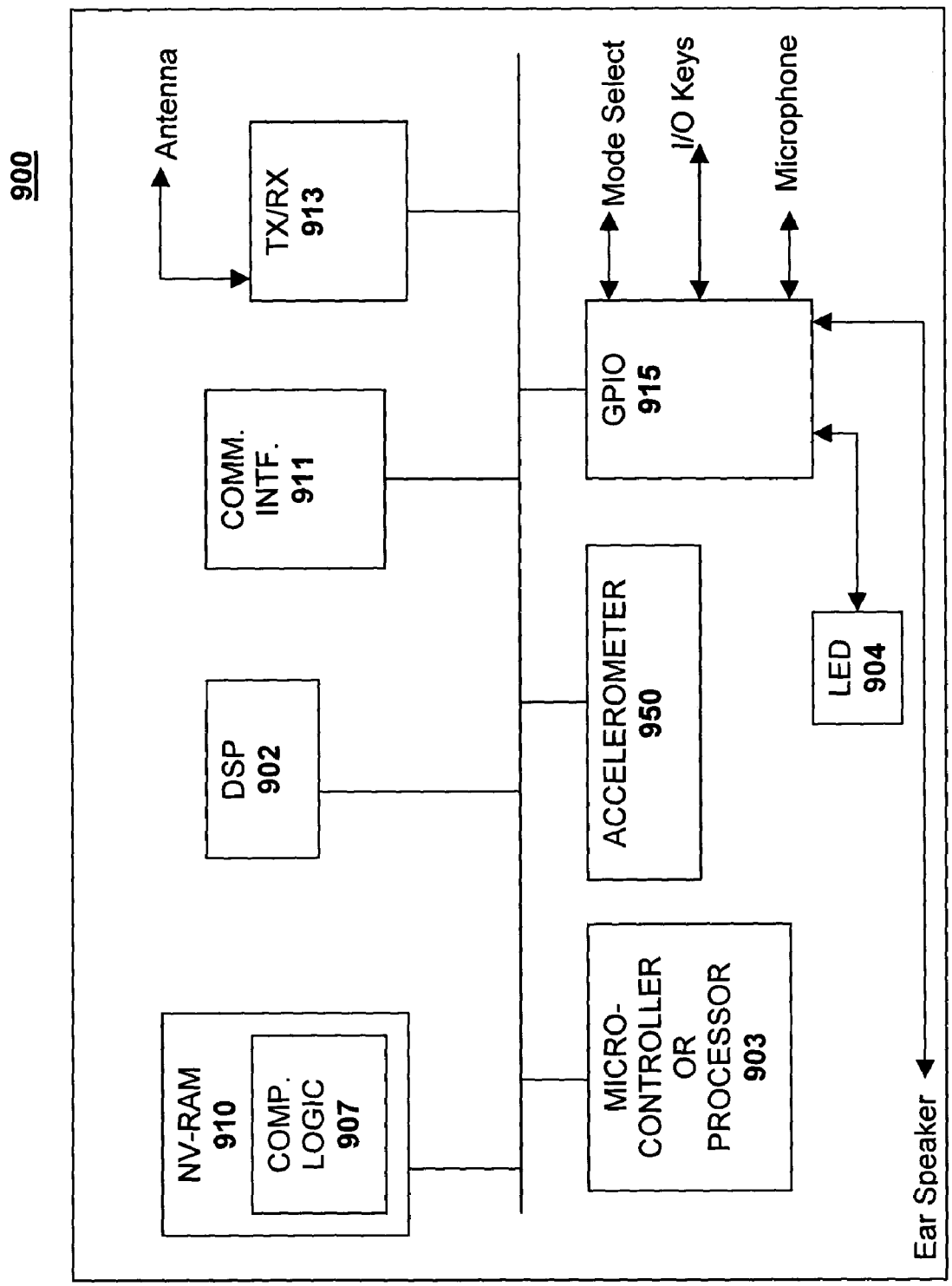
FIG. 9 illustrates an internal component view of a wireless client device such as wireless mobile phone, in accordance with one embodiment of the present invention.

FIG. 9 illustrates an internal component view of a wireless client device such as a wireless mobile phone (shown as refs. 100, 400, 500, 600, 700, and 800), in accordance with one embodiment of the present invention. As illustrated, wireless device 900 includes elements found in conventional mobile client devices such as micro-controller/processor 903, digital signal processor (DSP) 902, communication interface 911, transmitter/receiver (TX/RX) 913 (also known as transceiver), and general-purpose input/output (GPIO) 915. Except for the teachings of the present invention, these elements perform their conventional functions known in the art, including facilitating a user in communicating with another user of another communication device. The communication may be voice or data.

In particular, TX/RX 913 may support one or more of any of the known signaling protocols, including, but not limited to, code division multiple access (CDMA), time division multiple access (TDMA), global system for mobile communications (GSM), cellular digital packet data (CDPD), and so forth. Similarly, communication interface 911 may support one or more wireless communication protocols including, but not limited to, infrared, Bluetooth, IEEE 802.11b, and so forth. It should be noted that one or more of these elements may be omitted without departing from the spirit and scope of the invention. For example, since the luminescent images are generated and displayed utilizing wireless mobile phones, speaker and microphone of wireless mobile phone (shown as refs. 100, 400, 500, 600, 700, and 800) may be omitted because the luminescent images may be communicative in nature, but however, this need not be the case. As their constitutions are known, these elements will not be further described.

Wireless mobile phone 900 includes LEDs 904, and complementary logic 907 for LEDs 904 hosted by the non-volatile memory 910. Complementary logic 907 includes logic executed by the micro-controller/processor 903 to selectively activate/deactivate the LEDs 904 (shown as refs. 110, 415, 610, and 710). In one embodiment, the complementary logic causes the micro-controller/processor 903 to selectively activate the LEDs 904 to generate and display luminescent images.

Additionally shown in FIG. 9 is an accelerometer 950 to transmit data signals to the micro-controller/processor 903 regarding changes in acceleration corresponding to changes in direction of motion of the wireless mobile phone 900. In order to accommodate the small size of the components in a wireless mobile phone 900, the accelerometer may be any type of micro-miniature accelerometers known, such as, but not limited to, a piezoelectric micro-miniature accelerometer. The accelerometer 950 sends signals to the micro-controller/processor 903 to coordinate the selective activation of the LEDs 904. In alternate embodiments, other mechanisms for sensing one or more movement attributes indicative of the spatial movement of the phone, such as the movement speed or rate, may also be employed instead.

Figure 10:
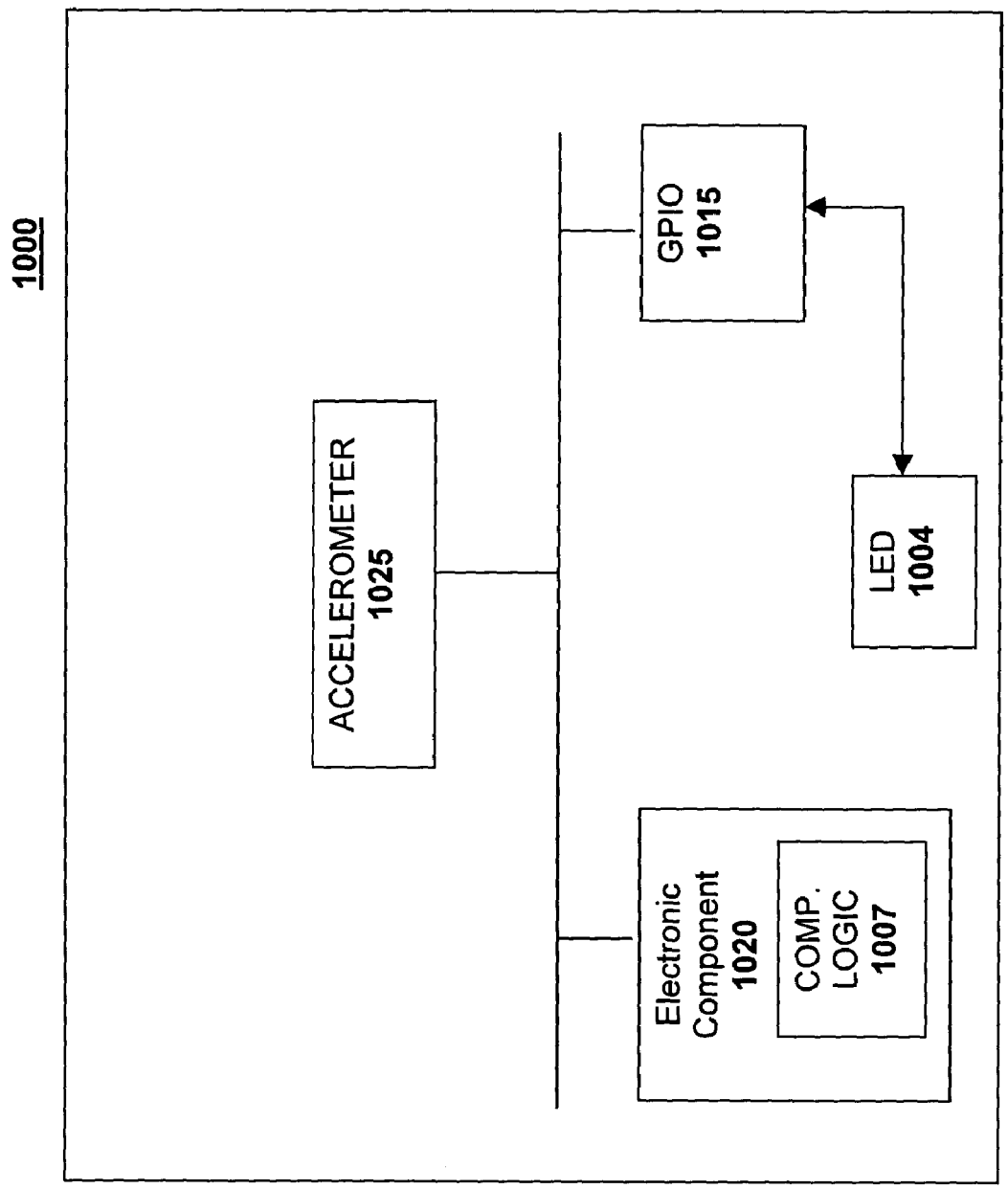
FIG. 10 illustrates an internal component view of storage/microprocessor chip embedded in an interchangeable covering, such as the storage/microprocessor chip, in accordance with one embodiment of the present invention.

FIG. 10 illustrates an internal component view of an interchangeable covering having an electronic component, such as the electronic component 823 of FIG. 8, in accordance with one embodiment of the present invention. As illustrated, interchangeable covering 1000 has an embedded electronic component 1020. The electronic component may be a microprocessor, a memory, or a combination of both. Additionally, the interchangeable covering 1000 optionally includes elements such as GPIO 1015 and an accelerometer 1025.

The interchangeable covering 1000 includes LEDs 1004, and complementary logic 1007 for the LEDs 1004 hosted by the electronic component 1020. The complementary logic 1007 includes logic executed by the electronic component 1020 to selectively activate the LEDs 1004, where these LEDs may be disposed in the interchangeable covering or disposed in the body casing (shown as refs. 110, 415, 610, and 710). The complementary logic 1007 in the interchangeable covering 1000 may be executed to selectively activate LEDs in a body casing to spatially paint a pre-stored luminescent image, such as the luminescent image shown in FIG. 8C. Alternatively, the complementary logic 1007 in the interchangeable covering 1000 may be executed to selectively activate LEDs 1004 in the interchangeable covering 1000 itself.

Figure 11:
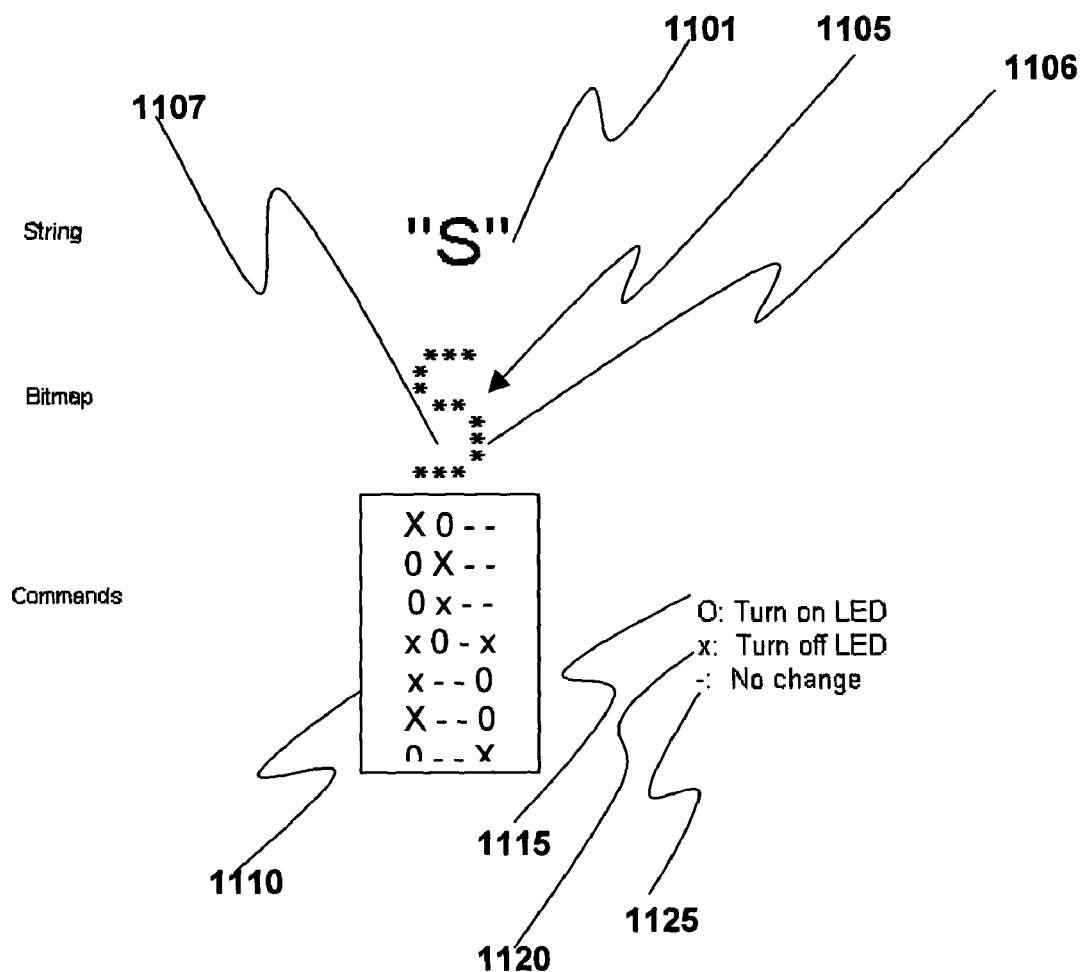
FIG. 11 illustrates turning on and off LEDs to spatially paint a luminescent image in further details, in accordance with one embodiment of the present invention.

FIG. 11 illustrates turning on and off LEDs to spatially paint a luminescent image, in accordance with one embodiment of the present invention. Shown in FIG. 11, is an example of a specification of an image 1101 to be spatially painted, such as, but not limited to, a text string of a single character, "S". Also shown in FIG. 11, is a bitmap 1105 corresponding to the specification of the image 1101. The bitmap 1105 is shown comprising of asterisks 1106 representing LEDs lit at particular points of a spatial movement cycle to spatially paint the luminescent specification of the image 1101. Blank areas 1107 of the bitmap 1105 represent LEDs being turned off at the various points of the spatial movement cycle. A movement cycle is movement from one extreme end spatial position to another, e.g. from the left spatial end to the right spatial end, or from the right spatial end to the left spatial end.

In one embodiment, LEDs are turned on, turned off, or have the on/off state maintained (i.e. unchanged) based at least upon a matrix of commands 1110. The matrix of commands 1110 is translated from the specification of the image 1101, and corresponds to a cycle of activity for the LEDs. As shown in FIG. 11, the matrix of commands 1110 includes commands to turn LEDs on ("O") 1115, commands to turn LEDs off ("X") 1120, and commands to leave LEDs unchanged ("-") 1125 for the various points of the spatial movement cycle. The commands occupying the same column position in matrix 1100 are executed at the same time. In FIG. 11, the commands illustrated are for an exemplary left to right movement (from the viewer's perspective). The corresponding commands for the reverse right to left movement may be derived from the illustrated commands by "transposing" the "first" "on" command and the "last" "unchanged" command of each sequence of "on" and "unchanged" commands of each row. For example, the illustrated sequence of "O---" of the first row (executed from left to right) for the left to right movement is changed to "---O" for the reverse right to left movement (executed from right to left). The leave unchanged command ("-") 1125 helps prevent LEDs from having unnecessary commands, i.e., when LEDs already have the turn on ("O") 1115 or the turn off ("X") 1120 commands, and the LEDs are to remain "on" or "off" correspondingly. Under these circumstances, the on/off commands need not be repeated for these LEDs.

The embodiment shown in FIG. 11 illustrates a specification of an image for a text string having a single character. However, as previously described, the specification of the image may comprise a text string having multiple characters or may be part of an image, such as the image shown in FIG. 5B. If specification of an image comprises a text string of multiple characters, a command to turn all of the LEDs off after spatially painting each letter may also be implemented.

Figure 12:
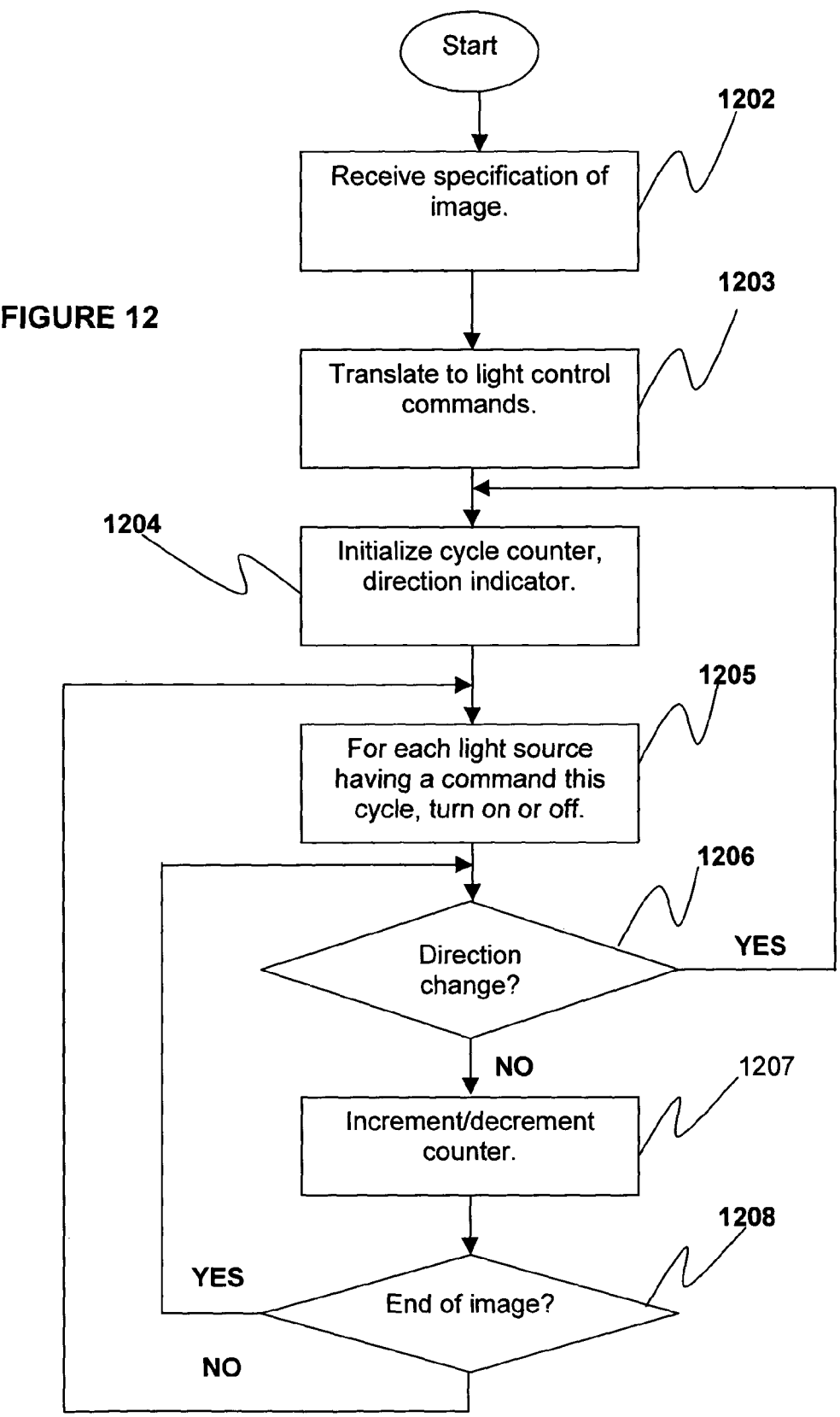
FIG. 12 illustrates an operational flow of the complementary logic as it applies to the facilitation of spatially painting luminescent images utilizing a wireless mobile phone, in accordance with one embodiment of the present invention.

FIG. 12 illustrates an operational flow of the complementary logic as it applies to the facilitation of spatially painting luminescent images utilizing a wireless mobile phone, in accordance with one embodiment of the present invention. The process begins at block 1202 where a specification of an image to be spatially painted is received. As described earlier, the luminescent image is to be spatially painted using the LEDs. The specification of the image is translated to a matrix of commands to turn the LEDs on, off, or to leave the LEDs unchanged 1203.

Once the specification of the image is translated to a matrix of commands, a cycle counter is initialized, and as previously described, an accelerometer may provide an indication of direction of motion to display non-direction dependent image 1204, i.e., preventing backward images. The matrix of commands is utilized to turn on, to turn off, and to leave unchanged LEDs during a cycle of activity of the LEDs 1205.

At the end of the cycle of activity of the LEDs, it is determined if a change in direction of motion is detected 1206. If a change in direction of the motion is detected, the cycle counter is initialized again with an indication of direction to spatially paint the image in a reverse direction in order to prevent a backward image. However, if the direction of motion is not changed, an increment or decrement of the specification of the image is counted, i.e., the subsequent images or parts of the images to be spatially painted 1207.

As the specification of the image is spatially painted in increments or decrements, it is determined if the end of the image is reached 1208. If the end of the image is spatially painted, i.e., the specification of the image has been completely spatially painted, it is determined if a change in direction of the motion is detected. However, if the end of the image has not been spatially painted, the activity of the LEDs is continued.

Figure 13A:
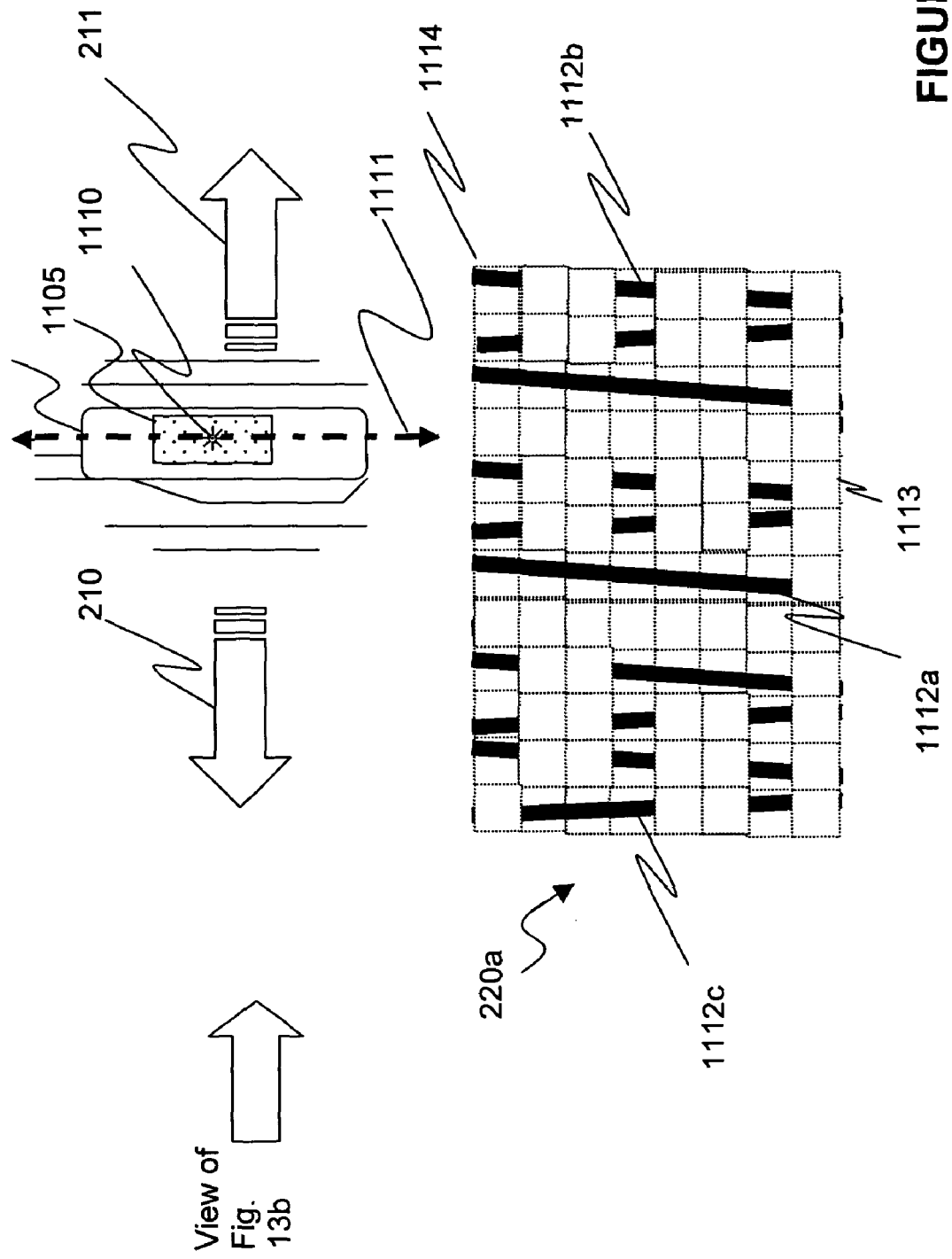
Figure 13B:
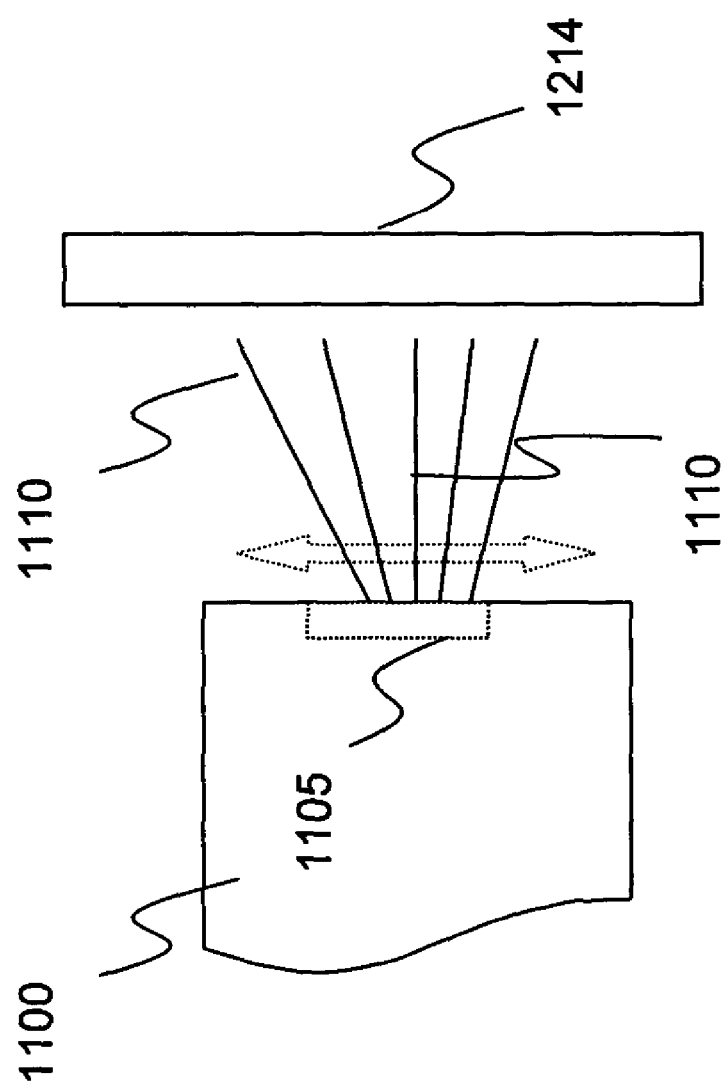

FIGS. 13a–13c illustrate spatial painting of illumination images utilizing a wireless mobile phone, in accordance with another family of embodiments of the present invention. For ease of understanding, this family of alternate embodiments is illustrated in the context of spatially painting portions of the same exemplary images 220a and 240a of FIGS. 2a–2b. Of course, this family of embodiments is not so limited, and it may be employed to spatially paint any image.

Wireless mobile phone 1100 of this family of alternate embodiments differs from the earlier described embodiments in that in lieu of externally disposed LEDs 110, phone 1100 is provided with a light source arrangement, such as a laser diode, to facilitate spatial painting of illumination images. For the illustrated and preferred embodiments, the light source arrangement is internally disposed, i.e. within the internal space defined by the body casing of phone 1100. However, even though not preferred, these embodiments may nevertheless be practiced with some of all of the elements of the light source arrangement being externally disposed, i.e. outside of the internal space defined by the body casing of phone 1100. Moreover, other embodiments may practice with both the luminescent as well as the illumination teachings of the present application.

As will be described in more details later referencing FIGS. 14, 15a–15c, and 16–18, in various implementations, the light source arrangement may include one or more collimated light sources, such as a laser diode or LED complemented with appropriate focusing lens, and zero or more mirrors, aligned and/or operated in a coordinated manner to provide a sweeping collimated light pulse 1110 to facilitate spatial painting of an illuminated line (e.g. along imaginary axis 1111) on a surface, such as surface 1214, in each of the very small fractions of a second, phone 1100 holds a point in space.

FIG. 13b illustrates the spatial painting of FIGS. 13a and 13c from another view, more specifically, from a view orthogonal to the views of FIGS. 13a and 13c. The view from which FIG. 13b is illustrated, is depicted in FIG. 13a as well as FIG. 13c.

Thus, with selective activation and deactivation of the light source in predetermined very small intervals of time (preferably of equal sizes), the illuminated line spatial painted by the light source may spatially paint a broken line, such as lines 1112a–1112e, effectively providing the ability to render a row or column of pixels 1113 (depending on the orientation of phone 1100). When coupled with the side-to-side movements (directions 210–211 in the case of FIG. 13a) or up-and-down movements (directions 210–211 in the case of FIG. 13c) as earlier described, the ability to render an array of pixels 1114 (which may also be considered as a bit map) is provided.

In other words, under this family of alternate embodiments, the effect of a row/column of the earlier described LEDs is effectuated through sweeping light pulse 1110 instead. However, in the case of the earlier embodiments, as described, the luminescent images are painted with the mobile communication device endowed with the earlier described teachings of the present invention, facing the intended audience. In contrast, for this family of alternate embodiments, the illumination images are typically painted with phone 1100 facing an opaque "canvas" 1214, such as a wall or other opaque planar surfaces, with opaque "canvas" 1214 being in the line of sight of the intended audience instead. However, for this family of alternate embodiments, the illumination images may also be painted with phone 1100 facing one side of a semi-transparent "canvas" 1214, and the opposite side of semi-transparent "canvas" 1214 being in the line of sight of the intended audience.

As will be described in further details below, in various embodiments, the light source arrangement is advantageously designed to allow light pulse 1110 to be held steady, as opposed to being sweeping (when it is used to paint illumination images), to enable phone 1100 to be also useable as a light pointer.

For the embodiment, to facilitate emission of light pulse 1110 (whether sweeping or held steady), the body casing includes photonic opening 1105. Opening 1105 is referred to as "photonic" in that, the portion of the body casing of phone 1100 occupied by photonic opening 1105 is constituted with materials that allows pass through transmissions of photons, and therefore making emission of light pulse 1110 possible.

In various preferred implementations, photonic opening 1105 includes "narrowly" focused diffuser lens (not shown) to facilitate a relative small amount of diffusion of the emitted light pulse 1110, thereby "widening" the illuminated line of pixels being spatially painted.

In other implementations, the alternate embodiments may be practiced employing other means of narrow diffusion, or without diffusion. Further, the alternate embodiments may be practiced with photonic opening 1105 being a plain physical opening instead.

Figure 14:
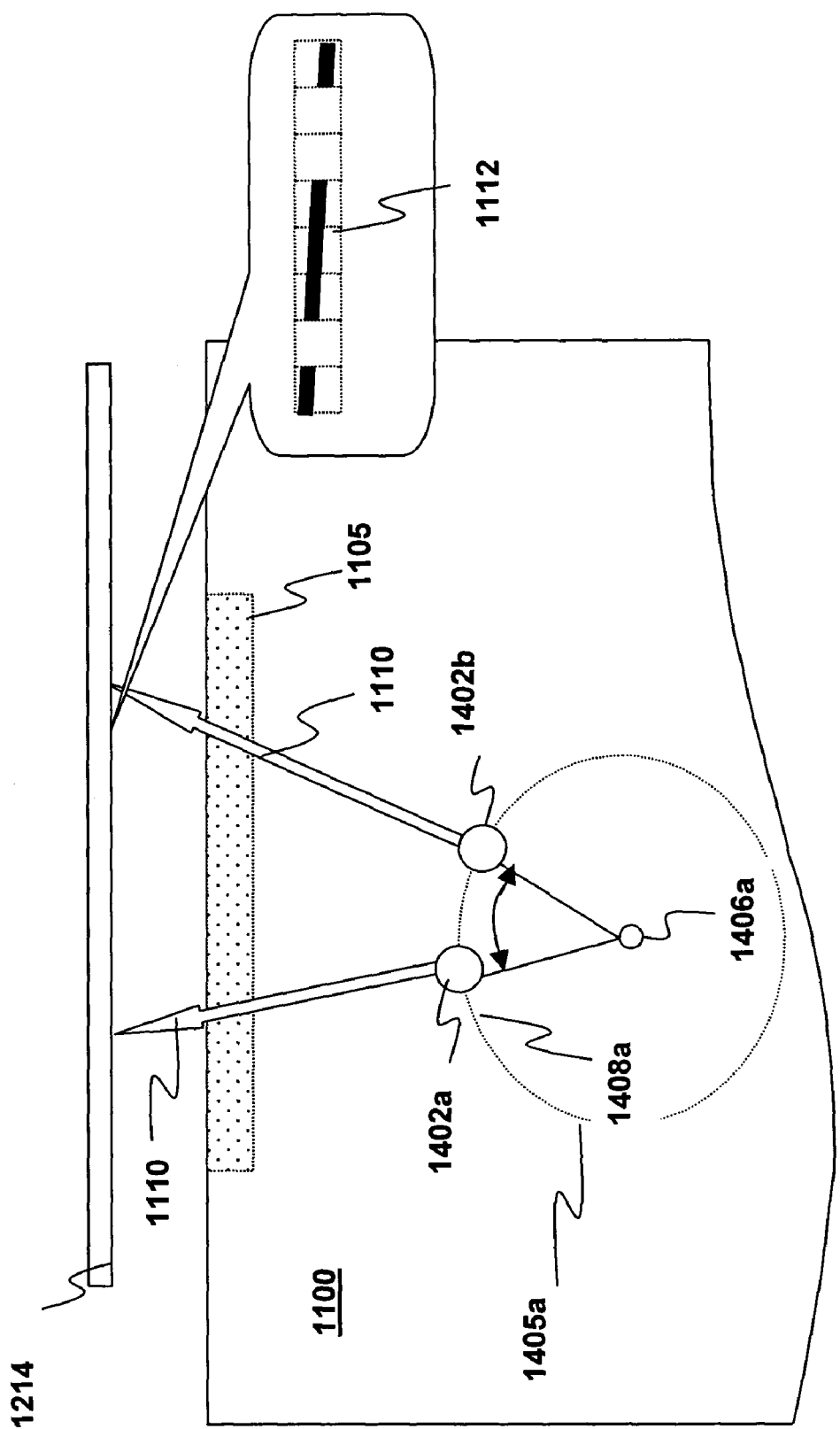
FIG. 14 illustrates the light source arrangement of the wireless mobile phone of FIGS. 13a–13c in further details, in accordance with one embodiment.

FIG. 14 illustrates the light source arrangement of the wireless mobile phone of FIGS. 13a–13c in further details, in accordance with one embodiment. For the embodiment, the light source arrangement includes a collimated light source, such as a laser diode or LED complemented with focusing lens. The laser diode/LED may be a single color laser diode/LED or a multi-color laser diode/LED.

More specifically, the collimated light source is provided with the mobility to occupy a number of deterministic positions in space at different times, with particular optical alignments to photonic opening 1105. FIG. 14 illustrates the light source in two positions in space and time 1402a–1402b.

For the embodiment, the deterministic spatial positions the light source may occupy are the positions on the portion of the circumference or "orbit" 1405a defined by angular range 1408a. In each of these positions, the light source forms a different optical relationship with photonic opening 1105, emitting with a different angular disposition.

Thus, during operation, as the operating logic of phone 1100 rapidly and successively moves the light source between these deterministic positions, sweeping light pulse 1110 may be formed. Further, as the operating logic of phone 1100 selectively activates/deactivates the light source, a row/column of pixels 1112 (with a desired combination of on and off effects) for an illumination image may be painted.

The movement of the light source between the positions on the portion of the circumference/orbit 1405a defined by angular range 1408a may be characterized as the light source rotating relative to axis 1406a within the constrained angular range 1408a. As illustrated, axis 1406a is orthogonal to the plane of view of FIG. 14.

In various implementations, the light source is attached to a moveable platform (not shown) that may be moved in the desired manner under the control of the operating logic, providing the light source with the desired mobility. In one implementation, the moveable platform is a re-positioned vibrator, such as a galvanometer, commonly found in most wireless mobile phones. Except for phone 1100, it is controlled by the operating logic in the described manner, when employed to assist in the rendering of illumination images.

Figure 15A:
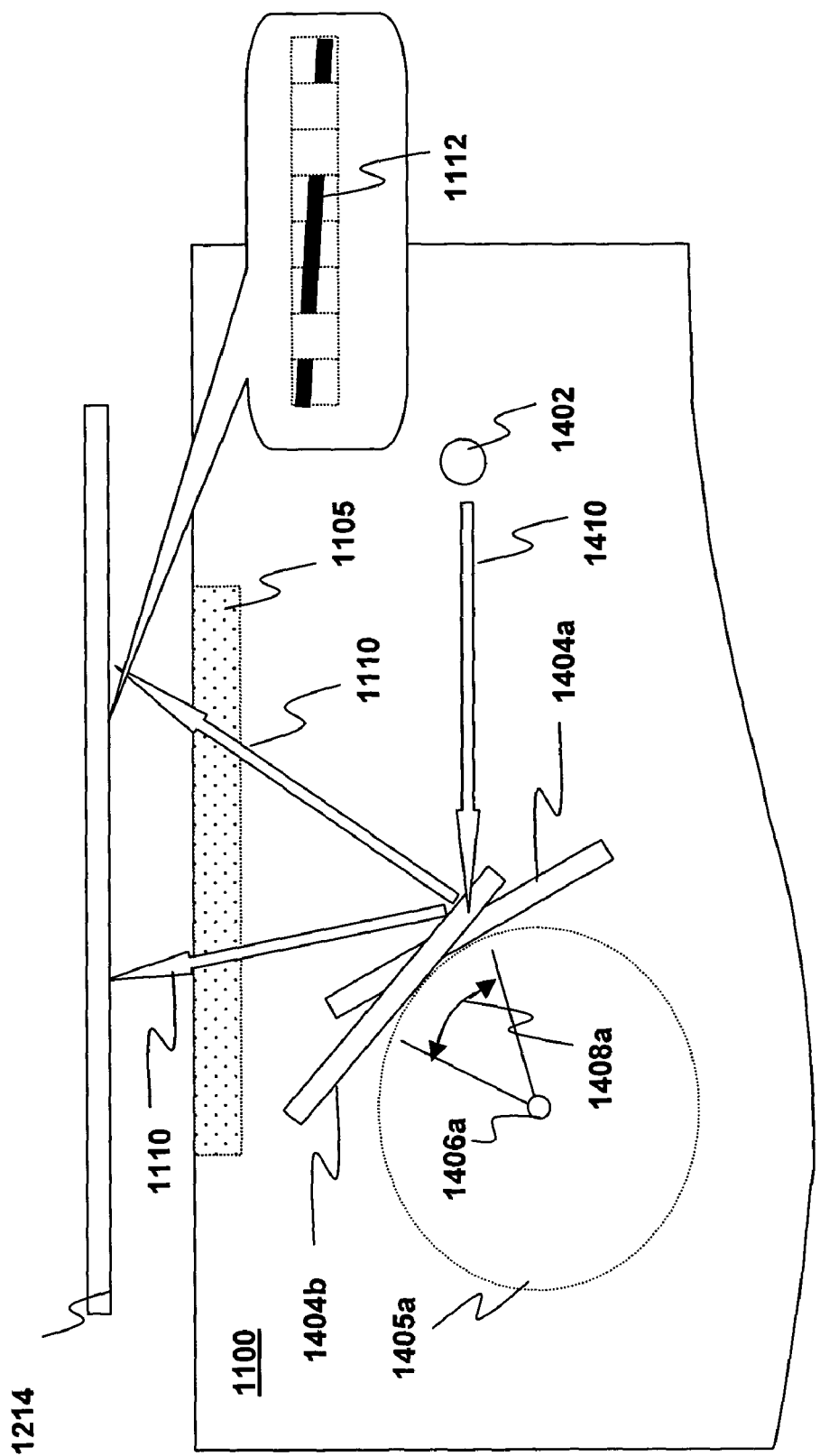
FIGS. 15a–15c illustrate the light source arrangement of the wireless mobile phone of FIGS. 13a–1 3c in further details, in accordance with a number of other embodiments.
Figure 15B:
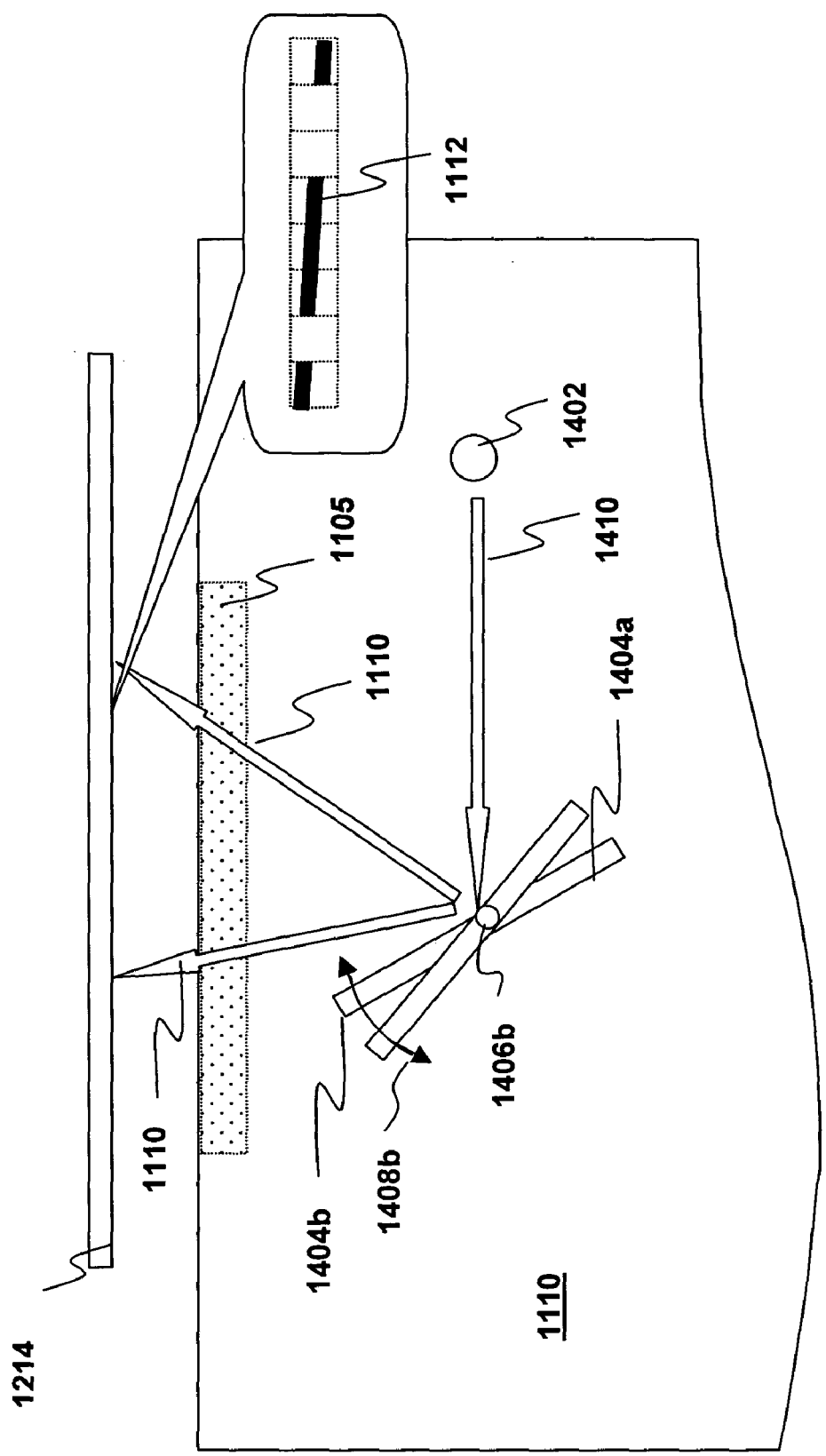
Figure 15C:
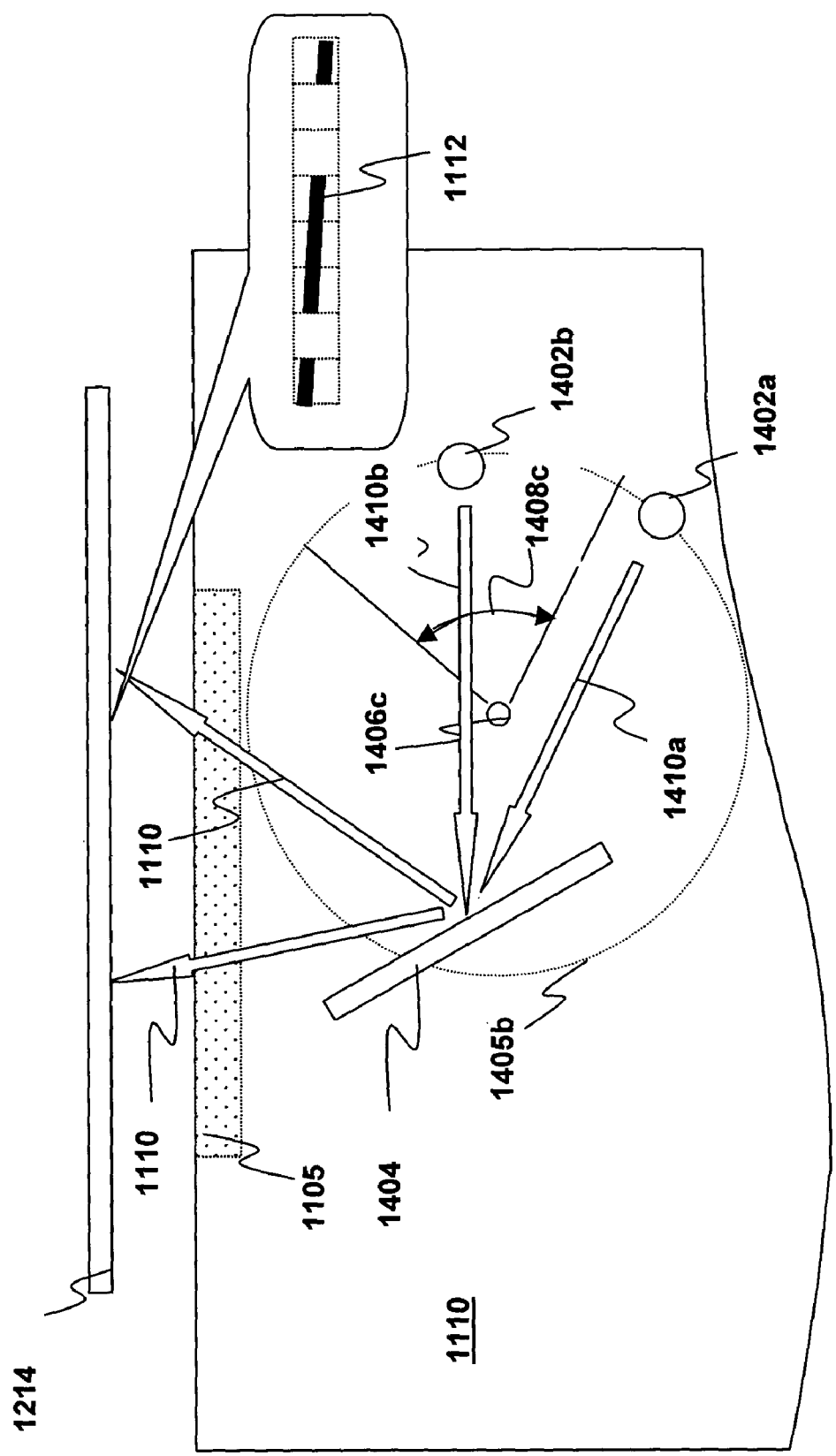

FIGS. 15a–15c illustrate the light source arrangement of the wireless mobile phone of FIGS. 13a–13c in further details, in accordance with a number of other embodiments. For the embodiments, the light source arrangement includes one or more collimated light sources (such as laser diodes or LED complemented with focusing lens), and one or more mirrors, complementarily aligned and/or operated.

More specifically, for the embodiment of FIG. 15a, the light source arrangement includes a collimated light source 1402 and a mirror with mobility to occupy a number of deterministic positions in space with particular optical alignments to light source 1402 and photonic opening 1105. FIG. 14a illustrates the mirror in two positions in space and time 1404a–1404b.

For the embodiment, the deterministic spatial positions the mirror may occupy are the positions on the portion of the circumference or "orbit" 1405a defined by angular range 1408a. In each of these positions, the mirror forms a different optical relationship with light source 1402. In particular, in each of these positions, the reflection of light pulse 1410 outputted by light source 1402, i.e. light pulse 1110, emits through photonic opening 1105 with a different angular disposition.

Thus, during operation, as the operating logic of phone 1100 rapidly and successively moves the mirror between these deterministic positions, sweeping light pulse 1110 may be formed. Further, as the operating logic of phone 1100 selectively activates/deactivates light source 1402, a row/column of pixels 1112 (with a desired combination of on and off effects) for an illumination image may be painted.

The movement of the mirror between the positions on the portion of the circumference or "orbit" 1405a defined by angular range 1408a may be characterized as the mirror rotating relative to axis 1406a within the constrained angular range 1408a. As illustrated, axis 1406a is parallel to the plane occupied by the mirror, both of which are orthogonal to the plane of view of FIG. 15a.

In various implementations, the mirror is attached to a moveable platform (not shown) that may be moved in the desired manner, under the control of the operating logic, providing the mirror with the desired mobility. In one implementation, the moveable platform is a re-positioned vibrator (such as a galvanometer), commonly found in most wireless mobile phones. Except for phone 1100, it is controlled by the operating logic in the described manner, when employed to assist in the rendering of illumination images.

While various mirrors known in the art or to be designed may be employed, in preferred embodiments, the mirror is a "first surface" mirror.

In alternate embodiments, light source 1402 may not be in direct optical alignment with mirror in positions 1404a–1404b. Additional mirrors may be employed to focus the light outputted by light source 1402 to mirror in positions 1404a–1404b.

Figure 18:
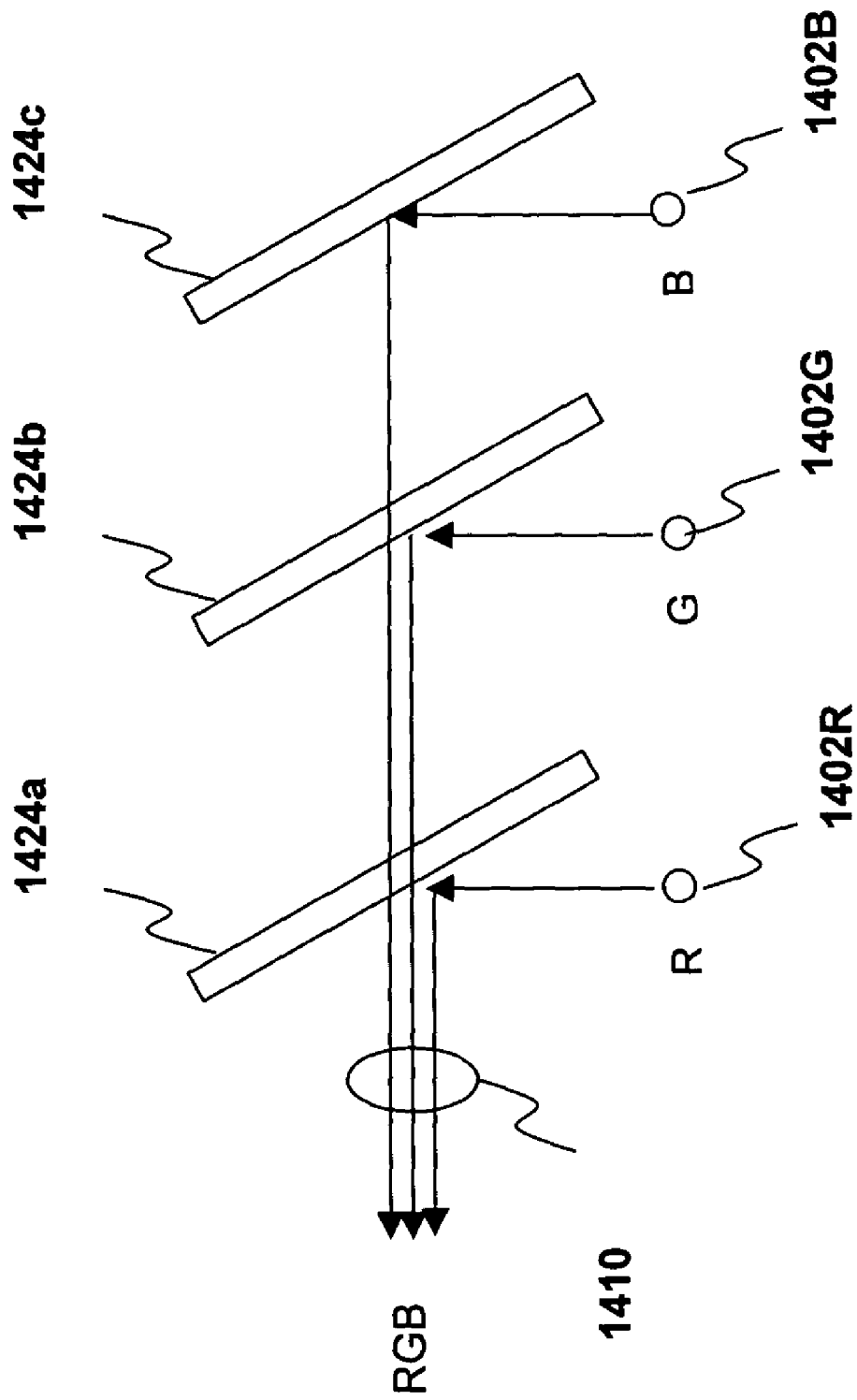
FIG. 18 illustrates a color light source arrangement of FIGS. 15a–15c in further details, in accordance with one embodiment.

In particular, in one implementation, as illustrated in FIG. 18, light source 1402 comprises a number of single color laser diodes 1402R, 1402B, and 1402G, and a number of color selecting mirrors 1424a–1424c optically coupled to each other as shown. More specifically, the single color laser diodes comprise red (R) laser diode 1402R, green laser diode 1402G and blue laser diode 1402B outputting laser lights in the red, green and blue spectrum respectively. The red, green and blue spectrum laser lights are correspondingly reflected off color selection mirrors 1424a–1424c and integrated, to form color laser light 1410, as illustrated.

FIG. 15b illustrates another embodiment of the light source arrangement. For the embodiment, the light source arrangement also comprises collimated light source 1402, and a mirror optically aligned with light source 1402 and photonic opening 1105 as shown. Similar to the embodiment of FIG. 15a, the mirror is also configured to be able to occupy a number of deterministic spatial positions at different points in time. Again, two of these mirror positions in space and time 1404a and 1404b are illustrated, and each of these positions forms a different optical relationship with light source 1402 and photonic opening 1105. As a result, the reflection of the light pulse 1410 outputted by light source 1402, i.e. light pulse 1110, again may emit through photonic opening 1105 with different angular dispositions.

Therefore, during operation, as the operating logic of phone 1100 rapidly and successively moves the mirror between these deterministic positions, sweeping light pulse 1110 may be formed. Further, as the operating logic of phone 1100 selectively activates/deactivates light source 1402, a row/column of pixels 1112 (with the desired on and off effects) for an illumination image may be painted.

For the embodiment, the movement of the mirror between the positions may be characterized as the mirror rotating relative to axis 1406b within the angular range 1408b. As illustrated, axis 1406b is co-planar to the plane occupied by the mirror, both of which are orthogonal to the plane of view of FIG. 15b.

In various implementations, the mirror is attached to a moveable platform (not shown) that may be moved in the desired manner, under the control of the operating logic, providing the mirror with the desired mobility. In one implementation, the moveable platform in a re-positioned vibrator (such as a galvanometer), commonly found in most wireless mobile phones. Except for phone 1100, it is controlled by the operating logic in the described manner, when employed to assist in the rendering of illumination images.

FIG. 15c illustrates another embodiment of the light source arrangement. For the embodiment, the light source arrangement also comprises a collimated light source, and mirror 1404 optically aligned with the light source and photonic opening 1105 as shown. Similar to the embodiments of FIGS. 15a–15b, mirror 1404 and the light source may assume different optical alignments during operation, to enable sweep light pulse 1110 to be emitted, and a row/column of pixels 1112 to be painted.

However, unlike the embodiments of FIGS. 15a–15b, mirror 1404 is "fixed". Instead, the light source is configured to be able to occupy a number of deterministic spatial positions at different points in time (as in FIG. 14). Two of these light source positions in space and time 1402a and 1402b are illustrated, and each of these positions forms a different optical relationship with mirror 1404. As a result, the reflections of the light pulses 1410a–1410b outputted by the light source in positions 1402a–1420b, i.e. light pulse 1110, may emit through photonic opening 1105 with different angular dispositions.

Thus, during operation, as the operating logic of phone 1100 rapidly and successively moves the light source between these deterministic positions, sweeping light pulse 1110 may be formed. Further, as the operating logic of phone 1100 activates/deactivates the light source, a row/column of pixels 1112 (with the desired on and off effects) for an illumination image may be painted.

For the embodiment, the movement of the light source between the positions may be characterized as the light source rotating relative to axis 1406c within the constrained angular range 1408c. As illustrated, axis 1406c is orthogonal to the plane of view of FIG. 15c.

In various implementations, the light source is attached to a moveable platform (not shown) that may be moved in the desired manner, under the control of the operating logic, providing the light source with the desired mobility. In one implementation, the moveable platform in a re-positioned vibrator (such as a galvanometer), commonly found in most wireless mobile phones. Except for phone 1100, it is controlled by the operating logic in the described manner, when employed to assist in the rendering of illumination images.

Figure 16:
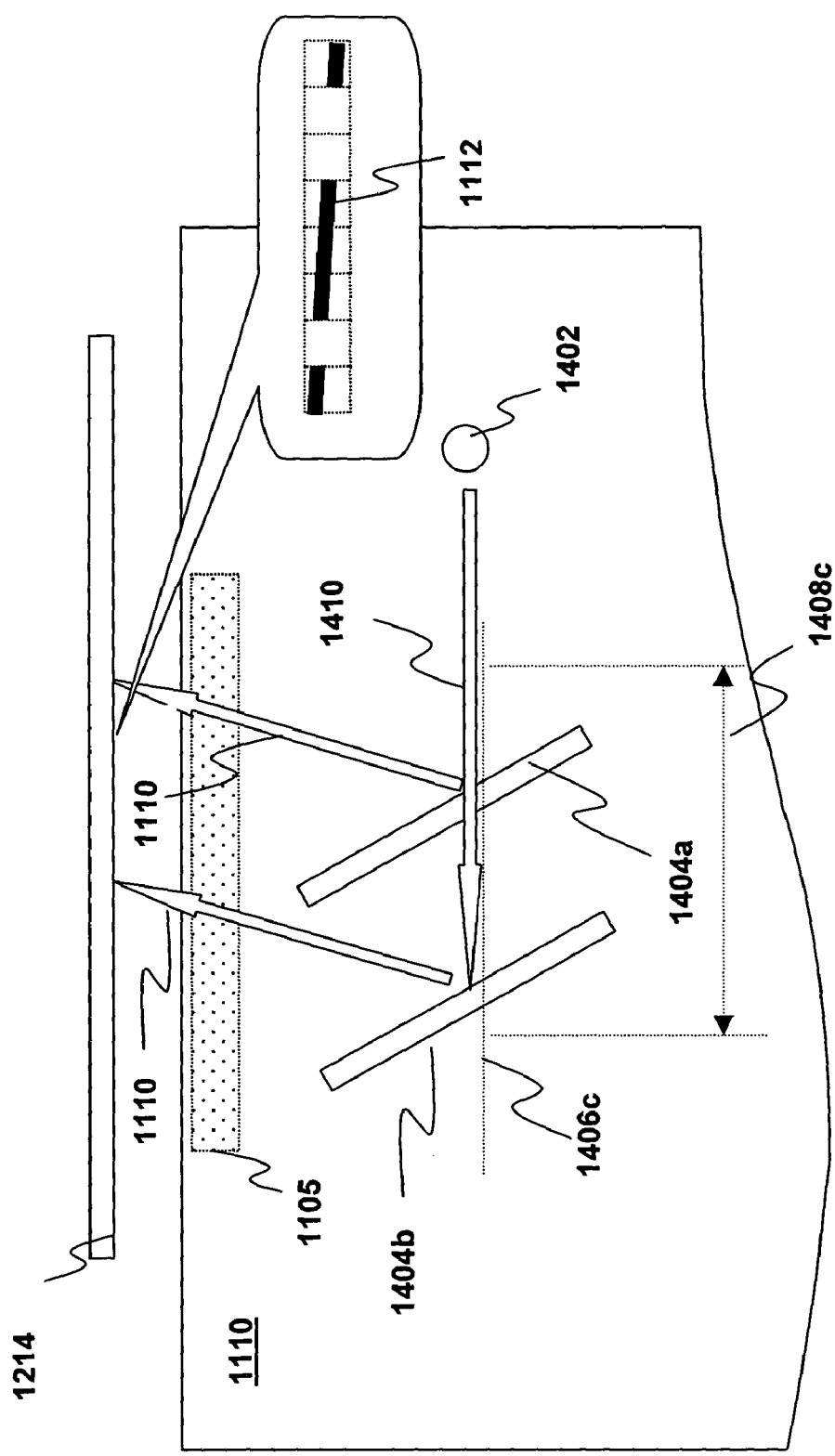
FIG. 16 illustrates the light source arrangement of the wireless mobile phone of FIGS. 13a–13c in further details, in accordance with another embodiment.

FIG. 16 illustrates yet another embodiment of the light source arrangement. For the embodiment, the light source arrangement also comprise collimated light source 1402, and a mirror optically aligned with light source 1402 and photonic opening 1105 as shown. Similar to the embodiments of FIGS. 15a–15c, the mirror and light source 1402 may assume different optical alignments during operation, to enable sweep light pulse 1110 to be emitted, and a row/column of pixels 1112 to be painted.

While similar to the embodiments of FIGS. 15a–15b, the mirror is provided with mobility, to enable it to be moved and occupy different spatial positions at different points in time. However, unlike the embodiments of FIGS. 15a–15b, the mirror does not move in a constrained "circular" manner. Instead, the mirror is configured to be able to move linearly along axis 1406c for a constrained linear range 1408c. Again, two of these mirror positions in space and time 1404a and 1404b are illustrated, and each of these positions forms a different optical relationship with light source 1402. As a result, the reflections of the light pulses 1410a–1410b outputted by light source 1402, i.e. light pulse 1110, may emit through photonic opening 1105 with different angular dispositions.

Thus, during operation, as the operating logic of phone 1110 rapidly and successively moves the mirror between these deterministic positions, sweeping light pulse 1110 may be formed. Further, as the operating logic of phone 1110 selectively activates/deactivates light source 1402, a row/column of pixels 1112 (with the desired on and off effects) for an illumination image may be painted.

In various implementations, the mirror is attached to a moveable platform (not shown) that may be moved in the desired manner, under the control of the operating logic, providing the mirror with the desired mobility. In one implementation, the moveable platform in a re-positioned vibrator (such as a galvanometer), commonly found in most wireless mobile phones. Except for phone 1100, it is controlled by the operating logic in the described manner, when employed to assist in the rendering of illumination images.

Figure 17:
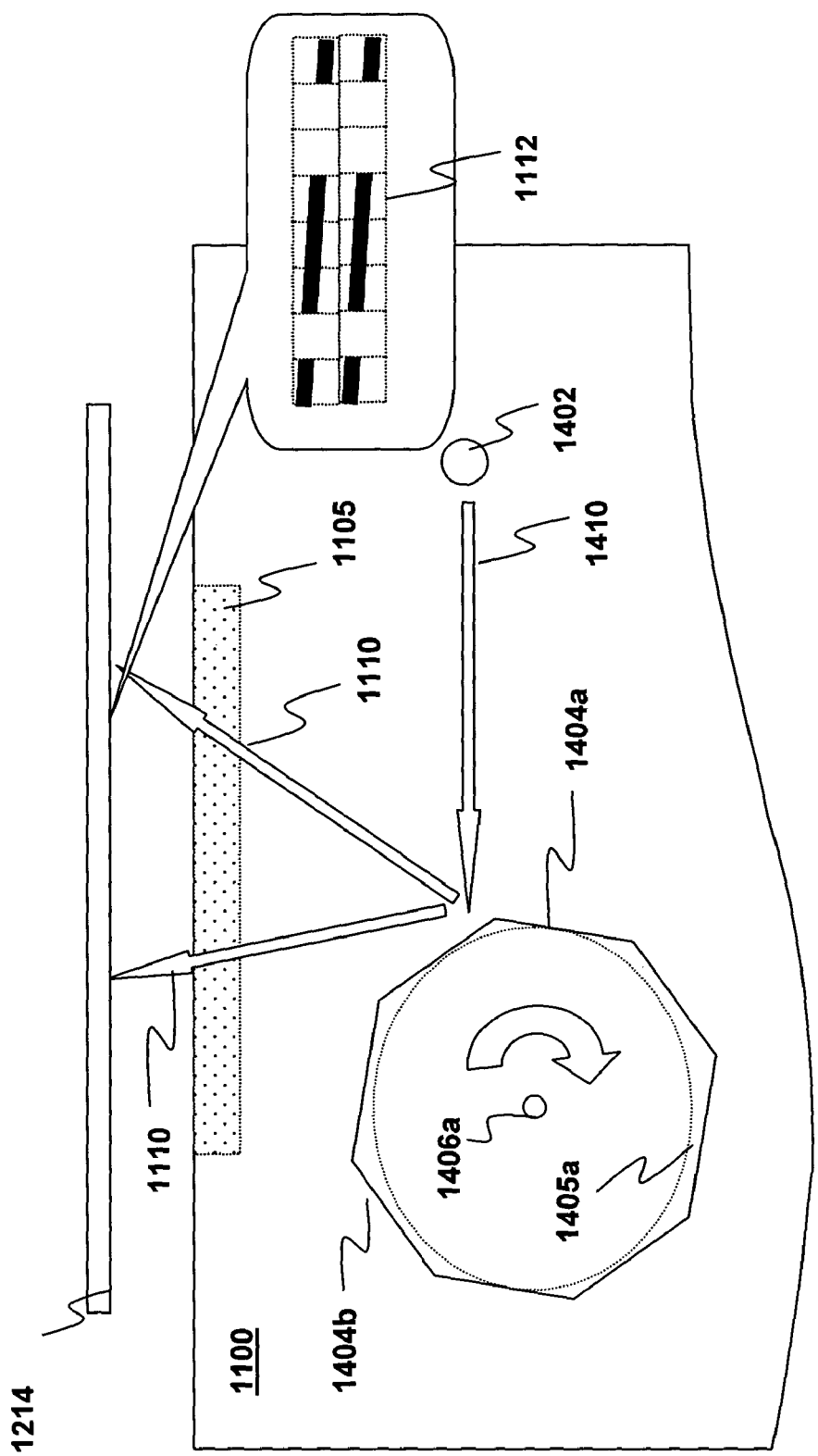
FIG. 17 illustrates the light source arrangement of the wireless mobile phone of FIGS. 13a–13c in further details, in accordance with yet another embodiment.

FIG. 17 illustrates yet another embodiment of the light source arrangement. The embodiment is similar to the embodiment of FIG. 15a, except the light source arrangement, in addition to collimated light source 1402, includes multiple mirrors (including mirrors 1404a and 1404b). More specifically, the multiple mirrors (including mirrors 1404a and 1404b) are arranged in a polygon configuration around "orbit" 1405a. The multiple mirrors (including mirrors 1404a and 1404b) are similarly provided with mobility, more specifically, the ability to rotate around axis 1406a, which as before, is orthogonal to the plane of view of FIG. 17. In various implementations, the mirrors (including mirrors 1404a and 1404b) are attached to a moveable platform (not shown) that may be move in the desired manner, under the control of the operating logic, providing the mirrors with the desired mobility. In one implementation, the moveable platform in a re-positioned vibrator (such as a galvanometer), commonly found in most wireless mobile phones. Except for phone 1100, it is controlled by the operating logic in the described manner, when employed to assist in the rendering of illumination images.

Collimated light source 1402 and the mirrors are optically aligned with each other and with photonic opening 1105 as shown. Thus, in lieu of forming different optical relationships with one mirror at different times (as the mirror is moved back and forth with a constrained angle range), collimated light source 1402 successively assumes different optical alignments with the multiple mirrors at different times during operation, to enable sweep light pulse 1110 to be emitted, and a row/column of pixels 1112 to be painted.

The resulting effect is that the successive illuminated "lines" (rows/columns) of pixels 1112 are substantially parallel to each other as illustrated in FIG. 17, as opposed to every other successive illuminated "lines" (rows/columns) of pixels being substantially parallel to each other, as illustrated in FIGS. 13a and 13c. For the embodiments of FIGS. 14, 15a–15c and 16, the adjacent "lines" (row/columns) of pixels tend to slightly angle away from each other as illustrated in FIGS. 13a and 13c (as the mirror or light source changes its direction of movement).

Thus, it can be seen the luminescent or illumination images may be formed with numerous LED and collimated light source arrangements. Certain embodiments may include additional components to the embodiments described. Others may not require all of the above components, or may combine one or more of the described components. In particular, the illumination image forming embodiments may be provided with indicators to assist a user in moving the wireless communication device, as earlier described for the embodiments for forming the luminescent images. Further, the illumination image forming embodiments may be provided with one or more duplicate sets of the light source and/or mirror resources to facilitate concurrent painting of multiple "lines" (rows/columns) of pixels at the same time.

In one embodiment, a portion of the invention, as described above, more specifically, the control logic, may be implemented using one or more micro-controller/processor. In one embodiment, the present invention may be implemented using software routines executed by one or more micro-controller processors.

In one embodiment, the software routines may be written in the C programming language. It should be appreciated that the software routines may be implemented in any of a wide variety of programming languages. In alternate embodiments, a portion of the invention may be implemented in discrete hardware or firmware.

For example, one or more application specific integrated circuit (ASICs) could be programmed with one or more of the above described functions to selectively activate a subset of a number of LEDs or a collimated light source. In another example, one or more functions for spatially painting luminescent/illumination images could be implemented in one or more ASICs on additional circuit boards, and the circuit boards could be inserted into wireless mobile phone or the interchangeable covering described above. In another example, field programmable gate arrays (FPGAs) or static programmable gate arrays (SPGAs) could be used to implement one or more functions of the invention. In yet another example, a combination of hardware and software could be used to implement one or more functions of the invention.

Thus, spatially painting luminescent/illumination images utilizing a wireless mobile phone having LED and/or collimated light source have been described. While the present invention has been described in terms of the above-illustrated embodiments, one skilled in the art will recognize that the present invention is not limited to the embodiments described. The present invention can be practiced with modification and alternation within the spirit and scope of the appended claims. Thus, the description is to be regarded as illustrative instead of restrictive on the present invention.

What is claimed is:

1. A wireless mobile communication device, comprising:
   a body casing defining an interior space, and having a photonic opening;
   a transmit/receive section to transmit and receive communication signals;
   first one or more light sources (LS) disposed in the defined interior space to contribute to outputting a first light pulse through the photonic opening of the body casing, when selectively activated/deactivated in one or more operational modes, the first one or more LS being directly or indirectly optically aligned with the photonic opening of the body casing, to facilitate emitting of the first light pulse, during the one or more operational modes;
   storage medium having instructions stored therein designed to selectively activate/deactivate the one or more LS to contribute to outputting the first light pulse;
   a processor coupled to the one or more LS and the storage medium to execute the instructions during the one or more operational modes;
   the instructions designed to maintain at least a first of the one or more LS in an activated state, to enable the wireless mobile communication device to be used as a light pointer, during a pointer operational mode; and
   a first mirror and a movable platform, to which a selected one of the first mirror and the first one or more light sources is attached to provide mobility for the selected one of the first mirror and the first one or more light sources, the first mirror optically coupling the first one or more light sources to the photonic opening, and the instructions are further designed to maintain the moveable platform, and therefore the selected one of the first mirror and the first one or more light sources, in a predetermined steady position, during said pointer operational mode.

2. A wireless mobile communication device, comprising:
   a body casing defining an interior space, and having a photonic opening;
   a transmit/receive section to transmit and receive communication signals;
   first one or more light sources (LS) disposed in the defined interior space to contribute to outputting a first light pulse through the photonic opening of the body casing, when selectively activated/deactivated in one or more operational modes, the first one or more LS being directly or indirectly optically aligned with the photonic opening of the body casing, to facilitate emitting of the first light pulse, during the one or more operational modes;
   storage medium having instructions stored therein designed to selectively activate/deactivate the one or more LS to contribute to outputting the first light pulse;
   a processor coupled to the one or more LS and the storage medium to execute the instructions during the one or more operational modes; and
   a first mirror and a movable platform, to which a selected one of the first mirror and the first one or more light sources is attached to provide mobility for a selected one of the first mirror and the first one or more light sources, the first mirror optically coupling the first one or more light sources to the photonic opening, and the instructions are designed to selectively activate/deactivate the LS, and move the moveable platform, and therefore the selected one of the first mirror and the first one or more light sources, in a coordinated manner, based at least in part on one or more user inputs, to facilitate a user in spatially painting an illumination image, using the wireless mobile communication device, during an illumination image painting operational mode.

3. The wireless mobile communication device of claim 2, wherein the moveable platform is adapted to be moveable around an axis that is substantially parallel to or co-planar with a plane occupied by the first mirror, and the instructions are designed to move the moveable platform, and therefore, the selected one of the first mirror and the first one or more light sources, relative to the axis for a predetermined angular range.

4. The wireless mobile communication device of claim 2, wherein
   the selected one of the first mirror and the first one or more light sources being attached to the moveable platform is the first mirror;
   the moveable platform is adapted to be moveable along an axis that is substantially perpendicular to a plane occupied by the first mirror; and
   the instructions are designed to move the moveable platform, and therefore, the first mirror, along the axis for a predetermined linear range.

5. The wireless mobile communication device of claim 2, wherein the instructions are further designed to park the moveable platform at a safety position, where any light pulses outputted by the first one or more light sources will be reflected by the first mirror back into the defined interior space and not emitted outside the wireless mobile communication device.

6. The wireless mobile communication device of claim 2, wherein the wireless mobile communication device further comprises an indicator, and the instructions are further equipped to employ the indicator to assist the user in spatially moving the wireless mobile communication device, while the instructions are selectively activating/deactivating the first one or more LS, and moving said moveable platform and the selected one of the first mirror and the first one or more light sources, in a coordinated matter.

7. The wireless mobile communication device of claim 6, wherein said indicator comprises a selected one of one or more light emitting diodes (LED) disposed on an exterior surface of the body casing and one or more audio alerts, and the instructions are further equipped to selectively activate/deactivate the selected one of the one or more LEDs and the one or more audio alerts.

8. The wireless mobile communication device of claim 6, wherein the wireless mobile communication device further comprises an accelerometer coupled to the processor, and the instructions are further designed to factor into consideration changes in acceleration measured by the accelerometer when employing the indicator to assist the user.

9. The wireless mobile communication device of claim 8, wherein the instructions are further designed to factor into consideration changes in acceleration of the wireless mobile communication device.

10. The wireless mobile communication device of claim 2, wherein the wireless mobile communication device is a selected one of a wireless mobile phone and a personal digital assistant equipped with wireless mobile communication capability.

11. A wireless mobile communication device, comprising:
a body casing defining an interior space, and having a photonic opening;
a transmit/receive section to transmit and receive communication signals;
first one or more light sources (LS) disposed in the defined interior space to contribute to outputting a first light pulse through the photonic opening of the body casing, when selectively activated/deactivated in one or more operational modes, the first one or more LS being directly or indirectly optically aligned with the photonic opening of the body casing, to facilitate emitting of the first light pulse, during the one or more operational modes;
storage medium having instructions stored therein designed to selectively activate/deactivate the one or more LS to contribute to outputting the first light pulse;
a processor coupled to the one or more LS and the storage medium to execute the instructions during the one or more operational modes; and
the first one or more light sources comprising a first, a second, and a third laser diode to output light pulse in a red, a green, and a blue spectrum respectively, and the wireless communication device further comprises a plurality of mirrors disposed in the defined interior space, between the photonic opening and the first one or more light sources to integrate the outputted light pulses in the red, blue, green spectrums to contribute to the forming of the first light pulse.

12. A wireless mobile communication device, comprising:
a body casing defining an interior space, and having a photonic opening;
a transmit/receive section to transmit and receive communication signals;
first one or more light sources (LS) disposed in the defined interior space to contribute to outputting a first light pulse through the photonic opening of the body casing, when selectively activated/deactivated in one or more operational modes, the first one or more LS being directly or indirectly optically aligned with the photonic opening of the body casing, to facilitate emitting of the first light pulse, during the one or more operational modes;
storage medium having instructions stored therein designed to selectively activate/deactivate the one or more LS to contribute to outputting the first light pulse;
a processor coupled to the one or more LS and the storage medium to execute the instructions during the one or more operational modes; and
second one or more LS to contribute to outputting a second light pulse, and a plurality of mirrors optically aligned with the first and second one or more LS and the photonic opening to facilitate emitting of the second light pulse.

13. A wireless mobile communication device, comprising:
a body casing defining an interior space, and having a photonic opening;
a transmit/receive section to transmit and receive communication signals;
first one or more light sources (LS) disposed in the defined interior space to contribute to outputting a first light pulse through the photonic opening of the body casing, when selectively activated/deactivated in one or more operational modes, the first one or more LS being directly or indirectly optically aligned with the photonic opening of the body casing, to facilitate emitting of the first light pulse, during the one or more operational modes;
storage medium having instructions stored therein designed to selectively activate/deactivate the one or more LS to contribute to outputting the first light pulse;
a processor coupled to the one or more LS and the storage medium to execute the instructions during the one or more operational modes; and
a small range diffuser complementarily disposed at least a selected one of said first one or more light sources and said photonic opening, to narrowly diffuse the first light pulse.

14. The wireless mobile communication device of claim 13, wherein the small range diffuser comprises a small range diffusion lens disposed at the photonic opening.

15. In a wireless mobile communication device, a method of operation, comprising:
entering a first functional mode of operation;
facilitating user communication with another user of another communication device, using the wireless mobile communication device, during the first functional mode of operation;
entering a second functional mode of operation;
emitting at least one light pulse from the wireless mobile communication device, during the second functional mode of operation;
selectively activating/deactivating first one or more light sources (LS) to contribute to outputting a first light pulse;
maintaining at least a first of the one or more LS in an activated state, to enable the emitted first light pulse be used as a light pointer; and
reflecting a first of the at least one light pulse off a first mirror, and maintaining a moveable platform to which a selected one of the first mirror and the first one or more LS is attached to provide mobility for the selected one of the first mirror and the first one or more light sources, in a predetermined steady position.

16. In a wireless mobile communication device, a method of operation, comprising:
entering a first functional mode of operation;
facilitating user communication with another user of another communication device, using the wireless mobile communication device, during the first functional mode of operation;
entering a second functional mode of operation;
emitting at least one light pulse from the wireless mobile communication device, during the second functional mode of operation; and
reflecting a first of the at least one light pulse off a first mirror, and moving a moveable platform to which a selected one of the first mirror and the first one or more light sources is attached to provide mobility for the selected one of the first mirror and the first one or more light sources, in a coordinated manner, based at least in part on an illumination image a user desires to paint spatially, using the wireless mobile communication device.

17. The method of claim 16, wherein said moving of the moveable platform comprises moving the moveable platform relative to an axis for a predetermined angular range, the axis being substantially parallel or coplanar to a plane occupied by the first mirror.

18. The method of claim 16, wherein said moving of the moveable platform comprises moving the moveable platform along an axis for a predetermined linear range, the axis being substantially perpendicular to a plane occupied by the selected one of the first mirror and the first one or more light sources.

19. The method of claim 16, wherein the method further comprises parking the moveable platform at a safety position, where any light pulse outputted by the first one or more light sources is reflected by the first mirror back into an interior space defined by the body casing, and not emitted outside the wireless mobile communication device.

20. The method of claim 16, wherein the method further comprises providing an indicator to assist the user in spatially moving the wireless mobile communication device, while the first one or more LS and the moveable platform/first mirror are being selectively activated/deactivated and moved respectively, in a coordinated matter.

21. The method of claim 20, wherein said indicator comprises a selected one of one or more light emitting diodes (LED) and one or more audio alerts disposed on an exterior surface of a body casing of the wireless mobile communication device, and said provision of the indicator comprises selective activation/deactivation of the one or more LEDs.

22. The method of claim 20, wherein the method further comprises receiving changes in acceleration of the wireless mobile communication device, measured by an accelerometer of the wireless mobile communication device, and factoring into consideration the measured changes when employing the indicator to assist the user.

23. In a wireless mobile communication device, a method of operation, comprising:

entering a first functional mode of operation;

facilitating user communication with another user of another communication device, using the wireless mobile communication device, during the first functional mode of operation;

entering a second functional mode of operation;

emitting at least a first and a second light pulse from the wireless mobile communication device, during the second functional mode of operation, comprising selectively activating/deactivating first and second one or more light sources (LS) to output a first and a second light pulse, with the outputted first and second light pulses being directed at a first and a second mirror respectively;

reflecting the first and second light pulses by the first and second mirrors to emit the first and second light pulses.

\* \* \* \* \*